(12) United States Patent
Kaliszewski et al.

(10) Patent No.: US 12,239,145 B2
(45) Date of Patent: Mar. 4, 2025

(54) DISPENSING APPARATUS

(71) Applicant: Vi Healthy Living Ltd., London (GB)

(72) Inventors: Paul Kaliszewski, London (GB); Stefan Knox, London (GB); Sarah Cheetham, London (GB); Alessandra Gaudio, London (GB)

(73) Assignee: Vi Healthy Living Ltd., London (GB)

( * ) Notice: Subject to any disclaimer, the term of this patent is extended or adjusted under 35 U.S.C. 154(b) by 56 days.

(21) Appl. No.: 18/296,599

(22) Filed: Apr. 6, 2023

(65) Prior Publication Data

US 2023/0248018 A1 Aug. 10, 2023

Related U.S. Application Data

(63) Continuation of application No. 16/851,938, filed on Apr. 17, 2020, now Pat. No. 11,622,568, which is a continuation of application No. PCT/EP2018/078812, filed on Oct. 19, 2018.

(30) Foreign Application Priority Data

Oct. 20, 2017 (GB) .................................... 1717319

(51) Int. Cl.
*A23G 9/28* (2006.01)
*A23G 9/22* (2006.01)
*A23G 9/44* (2006.01)
(52) U.S. Cl.
CPC ................. *A23G 9/28* (2013.01); *A23G 9/22* (2013.01); *A23G 9/283* (2013.01); *A23G 9/44* (2013.01)

(58) Field of Classification Search
CPC . A23G 9/22; A23G 9/28; A23G 9/283; A23G 9/285
See application file for complete search history.

(56) References Cited

U.S. PATENT DOCUMENTS 2,889,949 A    6/1959  Morris
3,794,952 A *  2/1974  Dowis .................... H01R 39/00
                                                  439/21
(Continued)

FOREIGN PATENT DOCUMENTS

CA         2194224 A1    1/1996
CN      101061826 A     10/2007
(Continued)

OTHER PUBLICATIONS

United States Non-Final Office Action dated Oct. 5, 2023 for U.S. Appl. No. 16/851,982.
(Continued)

*Primary Examiner* — John J Norton
(74) *Attorney, Agent, or Firm* — EIP US LLP

(57) ABSTRACT

There is described a dispensing apparatus for dispensing a food product from a container. The dispensing apparatus comprises a support for supporting a container of product when the container is loaded into the apparatus, an actuator for effecting movement of the support in a first direction during a product dispensing stroke of the apparatus and in a second direction during a return stroke of the apparatus; and a retainer for retaining a spent container of product so that a spent container is removed from the support during the return stroke.

11 Claims, 36 Drawing Sheets

(56) References Cited

U.S. PATENT DOCUMENTS

| | | | |
|---|---|---|---|
| 5,765,796 A * | 6/1998 | Lanus | A47B 11/00 248/349.1 |
| 5,893,485 A | 4/1999 | McGill | |
| 6,264,066 B1 | 7/2001 | Vincent et al. | |
| 6,325,244 B2 | 12/2001 | Vincent et al. | |
| 6,357,342 B1 * | 3/2002 | Leung | A47J 31/4403 99/290 |
| 7,210,401 B1 | 5/2007 | Rolfes et al. | |
| 8,419,011 B2 | 4/2013 | Gerlier et al. | |
| 9,054,476 B1 * | 6/2015 | Reynolds | H01R 39/64 |
| 9,775,368 B2 | 10/2017 | McGill et al. | |
| 10,485,376 B2 | 11/2019 | Van Den Aker et al. | |
| 2002/0119221 A1 | 8/2002 | Matsukura et al. | |
| 2003/0066431 A1 | 4/2003 | Fanzutti et al. | |
| 2004/0231521 A1 | 11/2004 | Yoakim | |
| 2006/0071017 A1 | 4/2006 | McGill | |
| 2006/0213376 A1 * | 9/2006 | Warner | A47J 31/4403 99/495 |
| 2007/0176349 A1 | 8/2007 | Gerlier et al. | |
| 2008/0121111 A1 | 5/2008 | Paget et al. | |
| 2008/0245236 A1 | 10/2008 | Ternite et al. | |
| 2009/0173235 A1 * | 7/2009 | Kollep | A47J 31/4482 99/279 |
| 2009/0250482 A1 | 10/2009 | Blanchino et al. | |
| 2010/0090039 A1 | 4/2010 | Jensen | |
| 2014/0134299 A1 | 5/2014 | Guidorzi et al. | |
| 2014/0374294 A1 | 12/2014 | Joyce | |
| 2015/0203285 A1 | 7/2015 | Baldo | |
| 2015/0216201 A1 | 8/2015 | Bruckner et al. | |
| 2016/0106256 A1 | 4/2016 | Gordon et al. | |
| 2016/0165920 A1 | 6/2016 | McGill et al. | |
| 2017/0053341 A1 | 2/2017 | Buchmann et al. | |
| 2017/0202247 A1 | 7/2017 | Lo Faro et al. | |
| 2019/0003763 A1 * | 1/2019 | Nelson | F25D 23/12 |
| 2022/0071436 A9 | 3/2022 | Eller et al. | |

FOREIGN PATENT DOCUMENTS

| | | |
|---|---|---|
| CN | 103153144 A | 6/2013 |
| CN | 204350996 U | 5/2015 |
| CN | 104872367 A | 9/2015 |
| EP | 2409608 A1 | 1/2012 |
| EP | 2480095 B1 | 8/2013 |
| EP | 3111811 A1 | 1/2017 |
| JP | 2003125713 A | 5/2003 |
| KR | 101702351 B1 | 2/2017 |
| WO | 9601224 A1 | 1/1996 |
| WO | 02085776 A2 | 10/2002 |
| WO | 2009098392 A1 | 8/2009 |
| WO | 2011134889 A1 | 11/2011 |
| WO | 2012007772 A2 | 1/2012 |
| WO | 2012007773 A2 | 1/2012 |
| WO | 2013080073 A1 | 6/2013 |
| WO | 2014184579 A1 | 11/2014 |
| WO | 2017118528 A1 | 7/2017 |
| WO | 2017139361 A1 | 8/2017 |

OTHER PUBLICATIONS

European Rule 164(2)(b) and Article 94(3) EPC Examination report dated Jul. 12, 2023 for European Application No. 18800483.2.
European Rule 164(2)(b) and Article 94(3) EPC Examination report dated Sep. 6, 2023 for European Application No. 18800484.0.
United Kingdom Search report dated Feb. 23, 2018 for GB Application No. GB1717319.6.
United Kingdom Search report dated Mar. 14, 2018 for GB Application No. GB1717320.4.
International Search Report and Written Opinion dated Mar. 21, 2019 for PCT Application No. PCT/EP2018/078812.
International Search Report and Written Opinion dated Mar. 29, 2019 for PCT Application No. PCT/EP2018/078813.
United Kingdom Search report dated Aug. 31, 2022 for GB Application No. GB1717319.6.
Chinese Office Action dated Dec. 2, 2022 for Chinese Application No. 2018800828278.
Chinese Office Action dated Dec. 15, 2022 for Chinese Application No. 2018800827275.
United States non-final office action dated Sep. 30, 2022 for U.S. Appl. No. 16/851,982.
United States Final Office Action dated May 11, 2023 for U.S. Appl. No. 16/851,982.

* cited by examiner

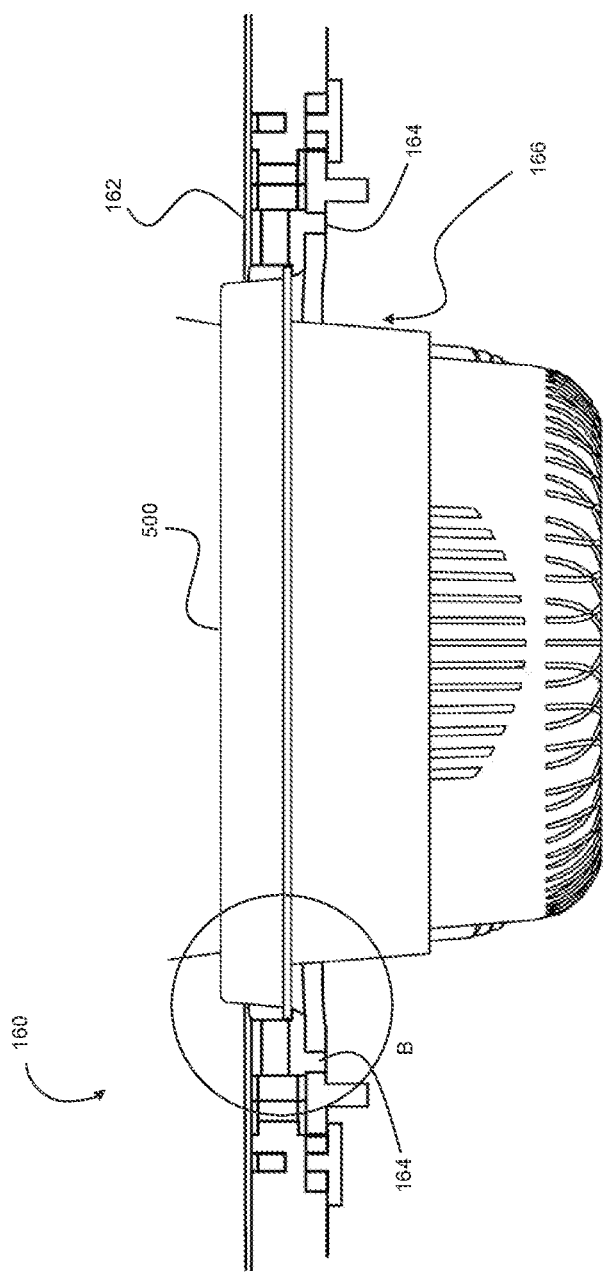

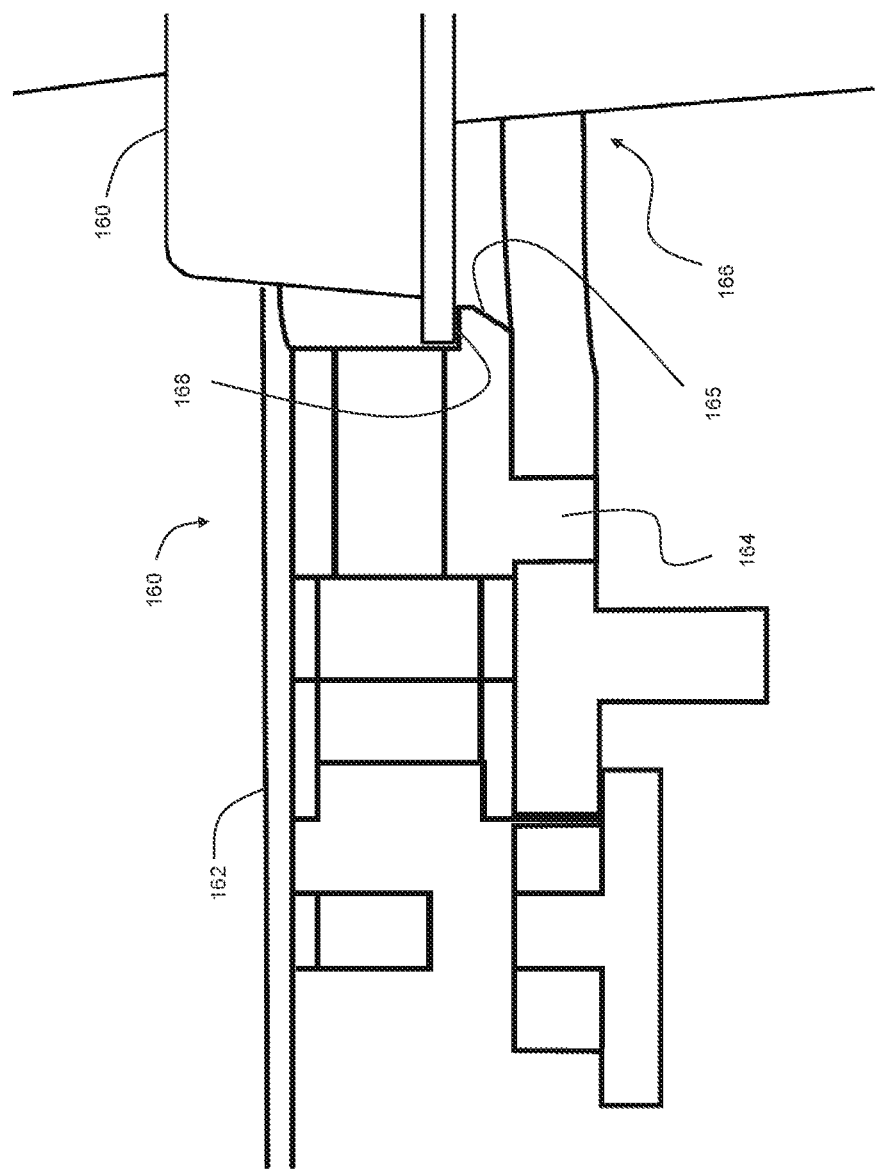

DISPENSING APPARATUS

CROSS-REFERENCE TO RELATED APPLICATIONS

This application is a continuation under 35 U.S.C. § 120 of U.S. Ser. No. 16/851,938 filed Apr. 17, 2020, which is a continuation of International Application No. PCT/EP2018/078812, filed Oct. 19, 2018 which claims priority to UK Application No. GB 1717319.6, filed Oct. 20, 2017, under 35 U.S.C. § 119(a). Each of the above-referenced patent applications is incorporated by reference in its entirety.

BACKGROUND OF THE INVENTION

Field of the Invention

The present invention relates to a dispensing apparatus for use with a container of consumable product.

Description of the Related Technology

Dispensing apparatus for dispensing singular or multiple portions of a food product, for example frozen or semi-frozen ice cream or yogurts on request by a user are known. Machines for delivering discrete portions of product are a clean and efficient method of delivery and are used in a number of locations both public and private.

As is known, some such dispensing apparatus use an actuator to force a plunger into a container of product which is then forced out of the container and collected prior to consumption.

It is desirable to provide an improved apparatus for dispensing food products from containers loaded into the apparatus.

It is also desirable to provide improved containers for food products for use in such dispensing apparatus.

SUMMARY

According to a first aspect of the present invention, there is provided a dispensing apparatus for dispensing a food product from a container, the dispensing apparatus comprising: a support for supporting a container of product when the container is loaded into the apparatus an actuator for effecting movement of the support in a first direction during a product dispensing stroke of the apparatus and in a second direction during a return stroke of the apparatus; and a retainer for retaining a spent container of product so that a spent container is removed from the support during the return stroke.

According to a second aspect of the present invention, there is provided a method for holding a container for product in a dispensing apparatus comprising: passing at least a portion of a container through an aperture of a holding mechanism in a first direction during a product dispensing stroke of the apparatus; moving the portion of a container towards the aperture of the holding mechanism in a second direction during a return stroke of the apparatus; engaging the container by engaging elements of the holding mechanism as the potion of the container is passing back through the aperture; retaining the container in a retainer of the holding mechanism, wherein the first direction is in a different direction to the second direction.

According to a third aspect of the present invention, there is provided a dispensing apparatus for dispensing a food product from a container, the dispensing apparatus comprising: a drawer comprising a region for receiving a container of product, the drawer arranged to be moved between an open position in which a container can be placed into the region and a closed position in which a container in the region is loaded into the apparatus, and a clearance mechanism for clearing a container from a dispensing zone within the apparatus after the product has been dispensed from the container, the clearance mechanism comprising an arrangement which as the drawer is being moved from the closed position to the open position and then back to the closed position causes a spent container to be removed from the dispensing zone.

According to a fourth aspect of the present invention, there is provided a method for moving a container of food product in a dispensing apparatus comprising:
moving a drawer to an open position; placing a first container into a region; moving the drawer to a closed position; moving the region and first container towards a compressing head; dispensing the product from the first container; moving the region away from the compressing head; retaining the first container in a retainer; moving the drawer to an open position to release the first container from the retainer and to allow a user to insert a second container; and, moving the drawer to a closed position to move the first container through an outlet to remove the first container from the dispensing zone and to prepare the second container for dispensing.

According to a fifth aspect of the present invention, there is provided a dispensing apparatus for dispensing a food product from a container, the dispensing apparatus comprising: a drawer comprising a region for receiving a container of product, the drawer arranged to be moved between an open position in which a container can be placed into the region and a closed position in which a container in the region is loaded into the apparatus, and a locking apparatus comprising an activatable locking element wherein the activatable locking element is arranged to prevent the drawer from being moved into the open position when the dispensing apparatus is in the process of dispensing product from a container.

According to a sixth aspect of the present invention, there is provided a method of preventing access to a dispensing apparatus for dispensing a food product from a container, the method comprising: inserting a container of product into a dispensing apparatus; activating an activatable locking element; initiating a dispensing procedure; completing a dispensing procedure; deactivating an activatable locking element.

According to a seventh aspect of the present invention, there is provided a dispensing apparatus for dispensing a food product from a container inserted in the apparatus, the dispensing apparatus comprising: an actuating arrangement for applying a force to the food product in the container to cause the food product to be extruded out from the container and from the apparatus; a controller for receiving information regarding the food product and setting one or more operation conditions of the actuating arrangement based on the received information.

According to an eighth aspect of the present invention, there is provided a method of amending the operation of a dispensing apparatus for dispensing product, the method comprising: receiving information by a controller regarding food product in a container; setting one or more operating conditions of an actuating arrangement for applying a force to the food product in the container to cause the food product to be extruded out from the container based on the received information.

According to a ninth aspect of the present invention, there is provided a dispensing apparatus for dispensing a food product from a container, the dispensing apparatus having a first operating mode and a second operating mode, and a control for enabling an operator to switch between the modes, wherein: the first operating mode has a mechanism for automatically removing empty containers from a dispensing zone of the apparatus; and, in the second operating mode the mechanism is inactive so that a user may remove empty containers from the dispensing apparatus manually.

According to a tenth aspect of the present invention, there is provided a method for operating a dispensing apparatus, the method comprising: actuating a control to activate a holding mechanism and a clearance mechanism; inserting a container to the dispensing apparatus; and, operating the dispensing apparatus; and, removing a spent container from the dispensing apparatus automatically.

According to an eleventh aspect of the present invention, there is provided a dispensing apparatus for dispensing a food product from a container, the dispensing apparatus comprising: a base; and, a body, wherein at least one of the base and body is rotatable with respect to the other, to provide access for a user from any side of the dispensing apparatus.

According to a twelfth aspect of the present invention, there is provided a method of dispensing product, the method comprising: selecting a container of product for use with the dispensing apparatus; rotating a dispensing apparatus from an initial position to an operating position; inserting the container into the apparatus; initiating a dispensing operation; completing a dispensing operation; and, rotating a dispensing apparatus from an operating position to an initial position.

According to a thirteenth aspect of the present invention, there is provided a dispensing apparatus for dispensing a food product from a container, the dispensing apparatus comprising: a region for receiving a container of product when the container is loaded into the apparatus; an actuator; and a compressing head; wherein, in use, the dispensing apparatus is arranged such that the actuator effects movement of the container towards the compressing head so that the container is moved into contact with the compressing head to compress the product to cause the product to be dispensed.

According to a fourteenth aspect of the present invention, there is provided a method for dispensing product from a container, the method comprising: activating an actuator to effect movement of a container of product towards a compressing head; moving the container into contact with the compressing head; compressing the container; dispensing product from the container.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 1b to 4c show longitudinal cross-sectional views of the example of a dispensing apparatus of FIG. 1 in use;
FIG. 5a shows a partial cross-sectional side-on view of a container held in a holding mechanism according to an example;
FIG. 5b shows a blown-up view of region B of FIG. 5a;
FIG. 14b shows a longitudinal cross-sectional view of the container of FIG. 14a;
FIG. 15b shows a longitudinal cross-sectional view of the container of FIG. 15a.

DETAILED DESCRIPTION OF CERTAIN INVENTIVE EMBODIMENTS

Figure 1A:
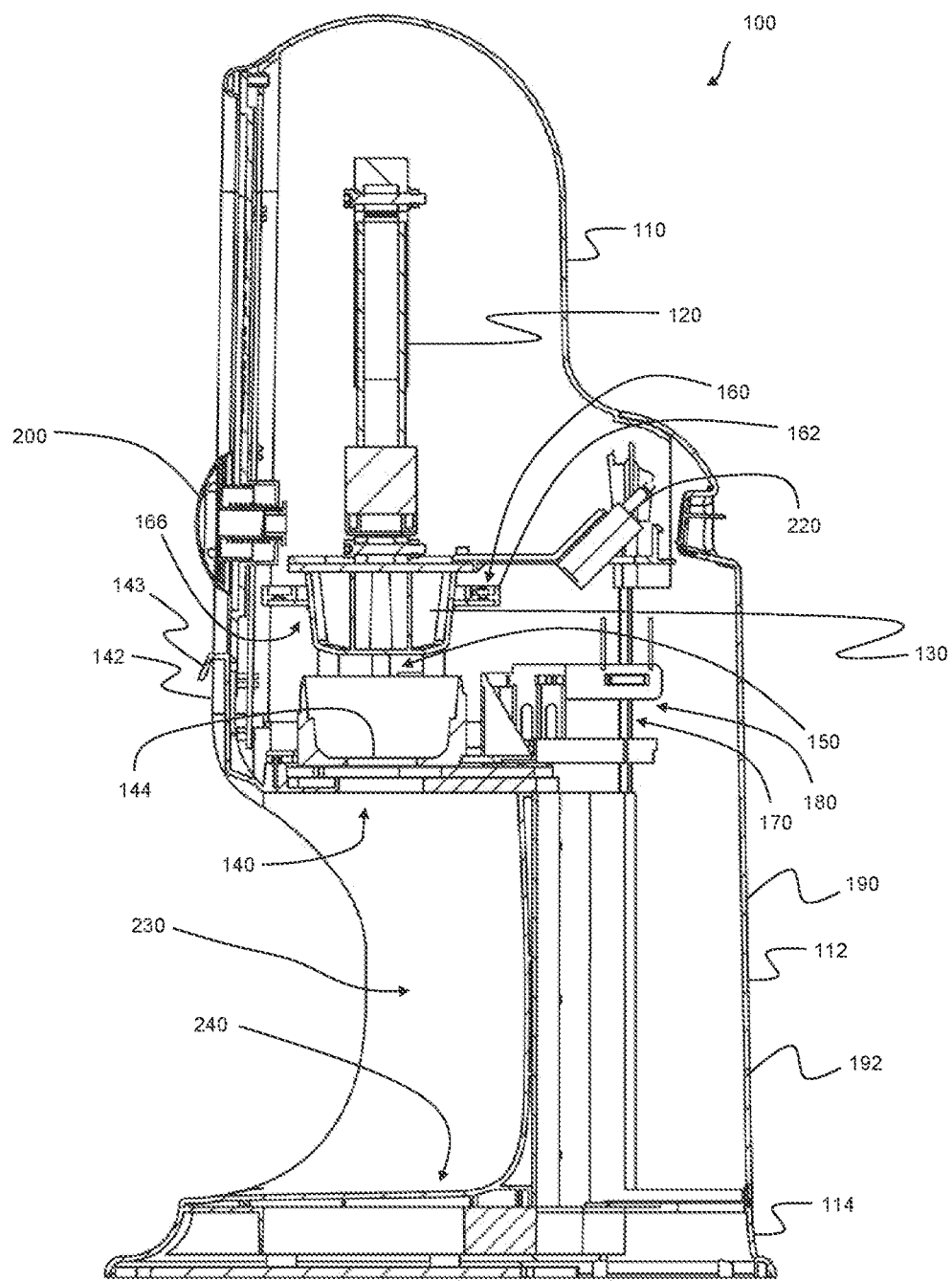
FIG. 1a shows a longitudinal cross-sectional view of an example of a dispensing apparatus.
Figure 1B:
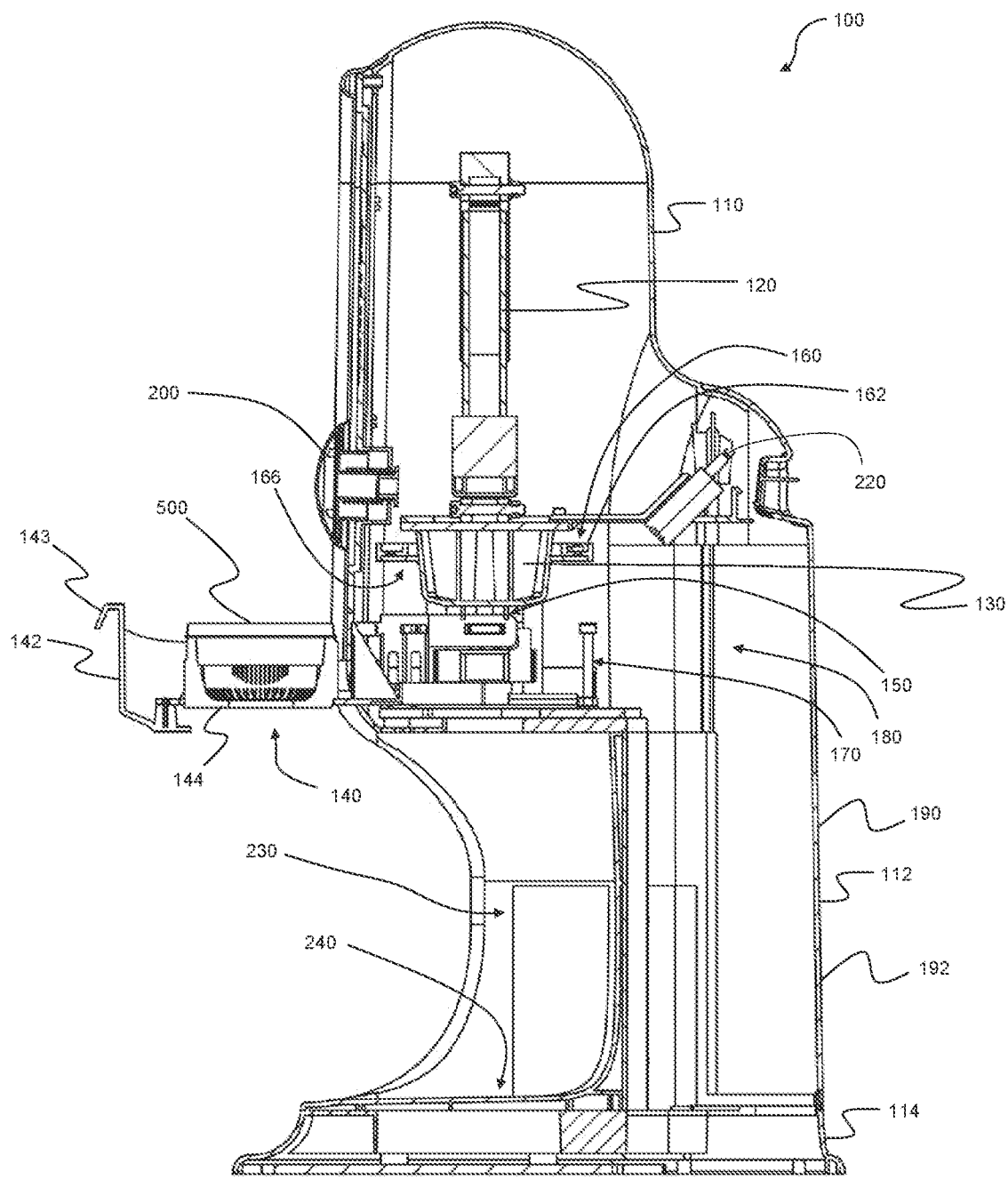

Referring first to FIGS. 1a and 1b, a schematic view of a dispensing apparatus 100 is shown. The dispensing apparatus 100 is for use by a user or operator to provide the user, operator or another party with a consumable food product from within containers which are to be used with the apparatus 100. The food product may for example be a confectionary product, for example a frozen or semi frozen product such as ice cream or yogurt but may be other food products as will be discussed below. The food product may also be a drinkable product.

In broad outline, the apparatus 100 dispenses a consumable food product from a container 500 of product. The apparatus 100 operates to apply a pressure or force to the container 500 such that the product within the container 500 is forced out of the container 500. This is then collected by a user, operator or another party. In a specific example, the apparatus 100 has a disposal system which can remove empty containers 500 from the main operating area of the apparatus 100 and store them prior to user removal of the container 500.

In a first example, the apparatus 100 has an actuating arrangement which contains an actuator 120, and a compressing head 130. The apparatus 100 also has a region 140 for receiving a container 500 of consumable food product.

The apparatus 100 is arranged such that the actuator 120 effects movement of the region 140, and a container 500 inserted into the region 140, in a first direction. The first direction is a direction towards the compressing head 130. The apparatus 100 is arranged such that, in use, the container 500 is moved into contact with the compressing head 130 such that the container 500 is compressed by the compressing head which, in turn, causes the product to be dispensed. In this example, a lid of the container 500 is forced into the interior of the container 500 as the lid is pressed against the compressing head 130 which reduces the internal volume of the container 500 and causes the food product to be extruded out of an aperture in the base of the container 500 and then through an aperture in the apparatus 100 so that the food product can be collected in a carton, dish, cup or indeed any collection device by a user.

The consumable product to be dispensed from the container 500 may be any product suitable for being dispensed in the manner described herein, which includes for example liquids, gels, pastes, semi-solids, creams among others. The product may be a frozen or semi-frozen product. In a specific preferred example the product may be frozen or semi-frozen yoghurt or frozen or semi-frozen ice cream. In a preferred embodiment, the product is at least one of frozen yoghurt, ice cream or other frozen dessert or confectionary and the apparatus 100 is at least one of a frozen yoghurt and ice cream dispenser.

Returning to FIGS. 1a and 1b, the apparatus 100 shown has a housing 110 which houses the actuator 120, compressing head 130 and region 140. The housing 110 of the apparatus 100 has a housing body 112 and a housing base 114. In an example, the housing body 112 and housing base 114 may be arranged to be integral elements of the housing 110. In another example, the housing body 112 and housing base 114 may be arranged such that at least one of the housing body 112 and housing base 114 is rotatable with respect to the other. Rotation of the housing body 112 and housing base 114 with respect to one another provides access for a user from any side of the dispensing apparatus 100.

The actuator 120 may be a linear actuator. The actuator 120 may be of the type provided by THOMSON, specifically the Electrak 050. The actuator 120 provides movement within the apparatus 100. In an example, the actuator 120 is arranged so as to produce movement in a substantially vertical direction. Referring to FIG. 1a, the actuator 120 is arranged above the compressing head 130 and the compressing head 130 is above the region 140. The actuator 120, in the specific example shown in FIG. 1a, is arranged to be centrally located with respect to the compressing head 130. In an example, the actuator 120 provides linear movement within the dispensing apparatus 100. In an example, the actuator 120 provides movement within the dispensing apparatus 100 in line with the longitudinal axis of the apparatus 100. The actuator 120 may have a range of forces for use in dispensing the product from a container 500 of up to about 600 N.

The compressing head 130 is arranged to be complementary in shape to the container 500, so that when the compressing head 130 and the container 500 contact one another, an even pressure is applied to the container 500. Applying an even pressure over the contacting surface of the container 500 and the compressing head 130 prevents the creation of particular pressure points between the compressing head 130 and the container 500. When such a pressure point exists, there is a danger that the container 500 is punctured rather than deformed. Furthermore, when a pressure point exists, there is a danger that the container 500 may be deformed unevenly which can prevent some product from being dispensed from the container 500.

The compressing head 130 may be arranged to be fixed in position. Fixing the compressing head 130 in position provides a firm surface against which to compress the container 500. Fixing the compressing head 130 reduces the number of moving elements associated with the compressing head 130 which reduces maintenance of the compressing head 130 itself.

The apparatus 100 may have a drawer 142 which can be moved between an open position and a closed position. FIG. 1a shows an example of the drawer 142 in the closed position. FIG. 1b shows an example of the drawer 142 in the open position. The region 140 may be contained within the drawer 142. In a specific example, the drawer 142 has a compartment 144 that defines the region 140 and the compartment 144 contains the container 500 in use, as shown in FIG. 1b.

Figure 2:
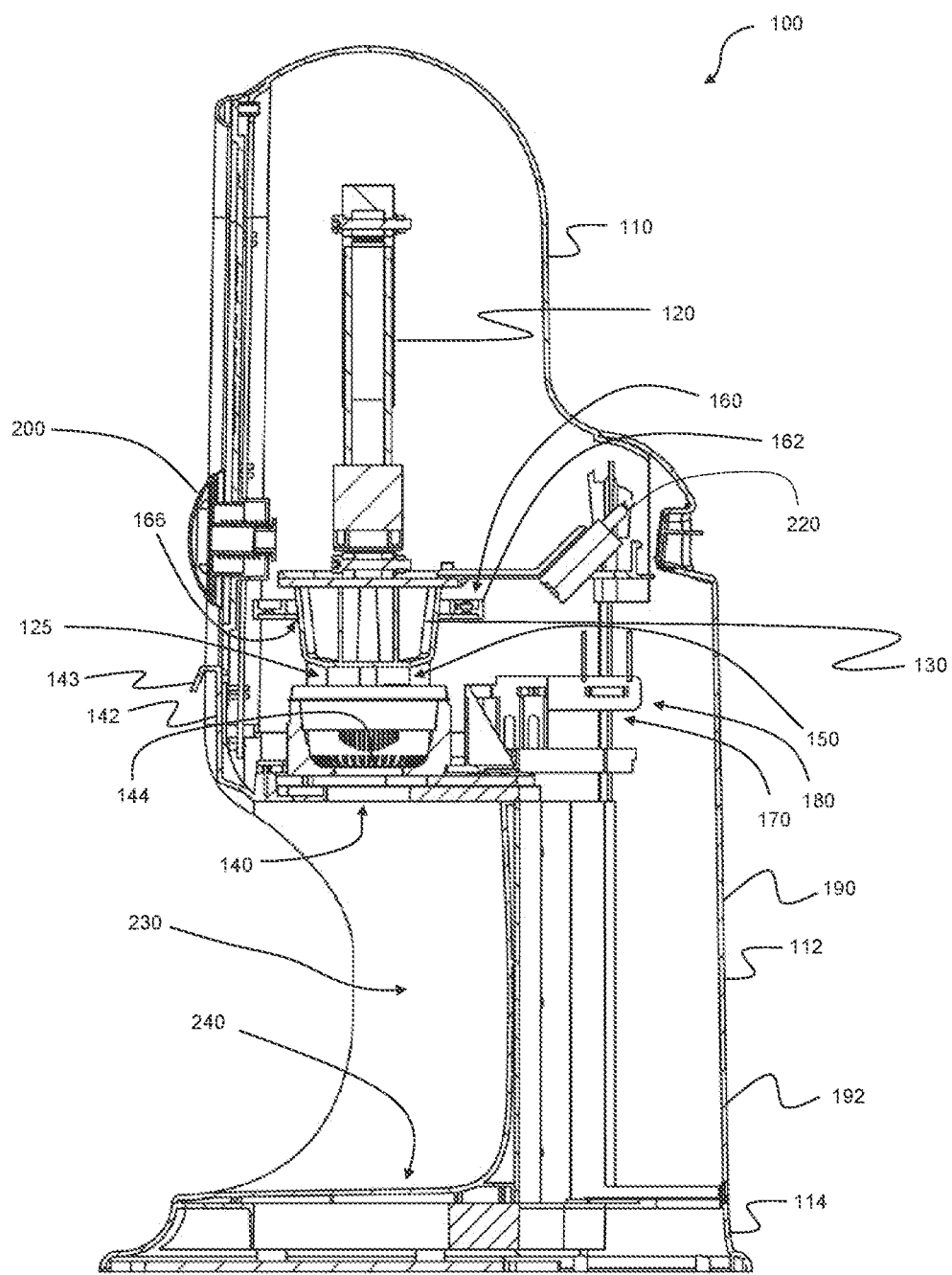

The drawer 142 may be opened to allow a user to insert a container 500 into the region 140. The region 140 may comprise a surface or a platform or a support on which a container 500 may be placed and supported. The region 140 may be moved vertically in use by the actuator 120. In the specific example shown in FIG. 1a, the drawer 142 has a compartment 144 for receiving a container 500. The drawer 142 is opened by a user, shown in the open position in FIG. 1b, and then a container 500 may be inserted into the compartment 144. The drawer 142 is closed prior to activation of the apparatus 100. An example of the apparatus 100 with the container 500 in the region 140 and the drawer 142 in the closed position is shown in FIG. 2. In a specific example, the compartment 144 may be any of a tray, insert or housing for receiving a container 500. In an example, the compartment 144 may be removable from the drawer 142, or an integral part of the drawer 142. In these examples, the region 140 is a region within the tray, insert or housing.

The drawer 142 may have a handle 143 or similar user operable element for facilitating opening and closing of the drawer 142. In another example, the drawer 142 may have a button (not shown) for opening the drawer 142 via electrical or mechanical means. A user may open the drawer 142 to obtain access to the compartment 144. Prior to insertion of the container 500 into the compartment 144 the drawer 142 is opened. Once the container 500 has been placed into the compartment 144, the drawer 142 is closed. The apparatus 100 may be prevented from initiation of the dispensing process when the drawer 142 is open. The drawer 142 is therefore referred to as being in an inactive position when it is open and in an active position when it is closed. The drawer 142 can therefore be moved between an active position (as shown in FIG. 1a) and an inactive position (as shown in FIG. 1b).

Referring now to FIG. 2, the apparatus 100 is shown with the container 500 in the region 140 and the drawer 142 in the active position. The apparatus 100 has a passage 150 which links the compressing head 130 to the region 140. In use, the actuator 120 moves the compartment 144 and hence the region 140 and the container 500 through the passage 150 so as to move the container 500 into contact with the compressing head 130. The passage 150 is therefore arranged to be sufficiently wide to allow a container 500 and the compartment 144 to pass through it.

The actuator 120 is arranged to lift the compartment 144 to move the container 500 into contact with the compressing head 130 during a dispensing stroke and to lower the compartment 144 during a return stroke.

The apparatus 100 has a locking apparatus. The locking apparatus has an activatable locking element. The activatable locking element may be activated by the user or by an element of the apparatus 100. The activatable locking element may be activated automatically after predetermined conditions are satisfied. The activatable locking element may be arranged to prevent the drawer 142 from being moved into the open position when the apparatus 100 is in the process of dispensing product from a container 500.

In an example, the activatable locking element may be a mechanical locking element such as a bolt lock or locking arm which would project into a locking element receiver of the locking apparatus. The bolt lock or locking arm may activate, or be received in the locking element receiver, automatically upon movement of the drawer into the closed position, or upon initiation of the dispensing operation.

In an example, the activatable locking element may be an electronic locking element such as an electromagnet. The electronic locking element may be activated or deactivated by, for example, any of the following: RFID card technology; MFID technology; electronic security token or passcode, biometric authentication system e.g. finger print scanner etc. Alternatively the electronic locking element may be automatically activated, as mentioned above for the mechanical locking element, for example, when the drawer 142 is moved from the open position to the closed position.

Predetermined conditions to be satisfied prior to automatic activation of the activatable locking element may be any or a number of the following: a container 500 being received in the region 140; the drawer 142 being in the closed position; power being supplied to the apparatus 100; the container 500 being suitably oriented in the region 140; the container 500 having all packaging removed from it, including for example any stickers or label or the like; the container 500 being a genuine container for use with the apparatus 100; and, the container 500 containing a product dispensable by the dispensing apparatus 100. In this context, "dispensable" is used to mean capable of being dispensed.

In an example, the dispensing apparatus 100 would be prevented from initiating a dispensing operation when the drawer 142 is in the open position and before the activatable locking element is in the activated position once the drawer 142 has been moved to the closed position. After conclusion of the dispensing operation, the activatable locking element may be deactivated to enable the drawer 142 to be moved to the open position.

Figure 3A:
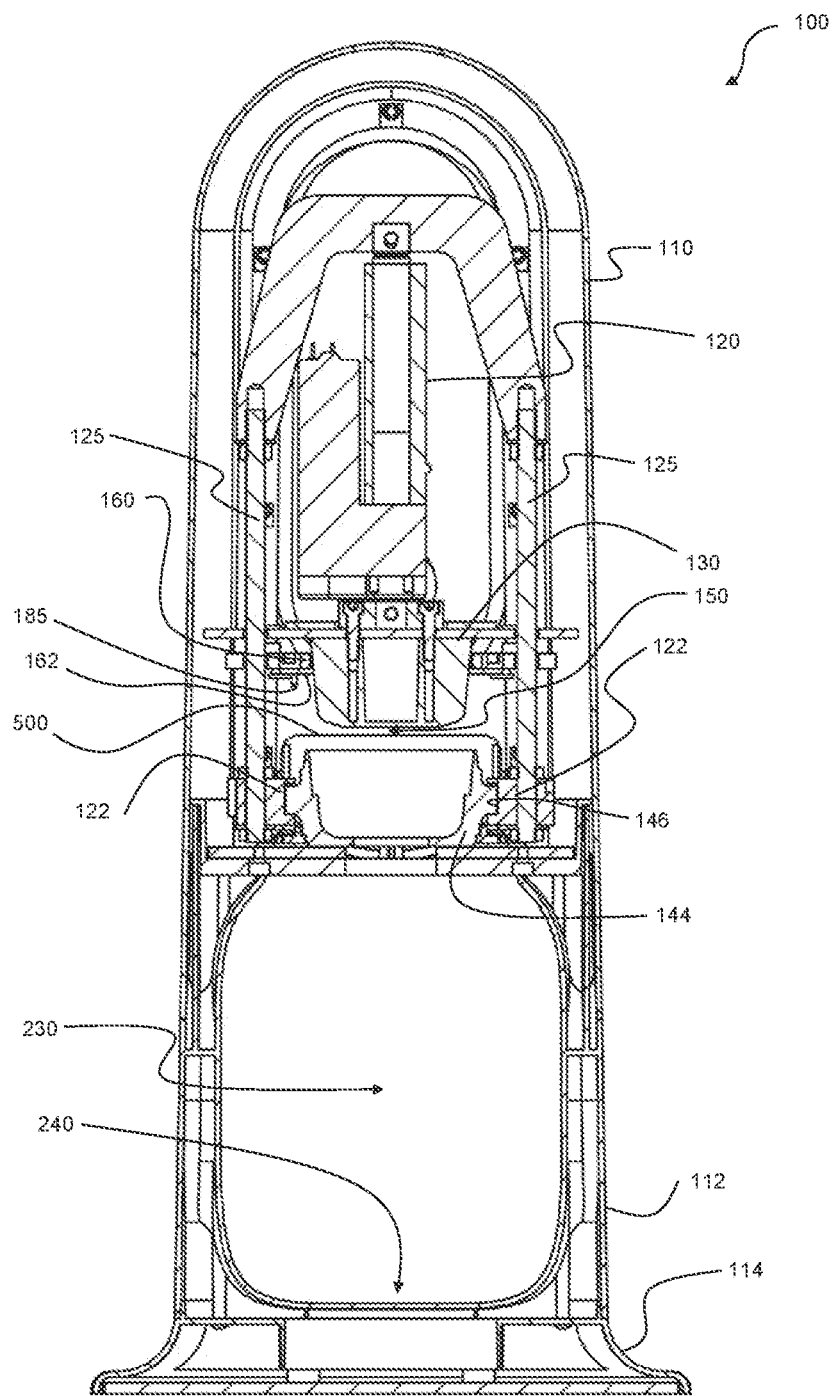

In use, the drawer 142 is moved to the inactive position and a container 500 inserted into the compartment 144, as shown in FIG. 1b. The drawer 142 is then moved to the active position, as shown in FIG. 2. As the drawer 142 is moved into the active position the compartment 144 engages with the actuator 120. In the example shown in FIG. 3a, projections 146 of the compartment 144 slide between actuator handles 122. The actuator handles 122 enable the actuator 120 to grip and then stably move the compartment 144. The actuator handles 122 are slidably attached to the actuator posts 125. The actuator 120 slides the handles 122, up and down the posts 125 during the dispensing and return strokes respectively in order to lift and then lower the compartment 144.

In another example, the compartment 144 may have one or more recesses with which one or more projections of the actuator 120 engage prior to movement of the compartment 144. Any combination of projection and recess may be provided to enable mechanical engagement between the actuator 120 and the compartment 144.

In an alternate example, the actuator 120 may engage with the drawer 142 via a non-mechanical connection, such as through electromagnets which are only activated once the drawer 142 is in the active position. The electromagnets enable the actuator 120 to grip and therefore move the region 140. In this example, the dispensing operation may be prevented until the electromagnets are activated.

Figure 3B:
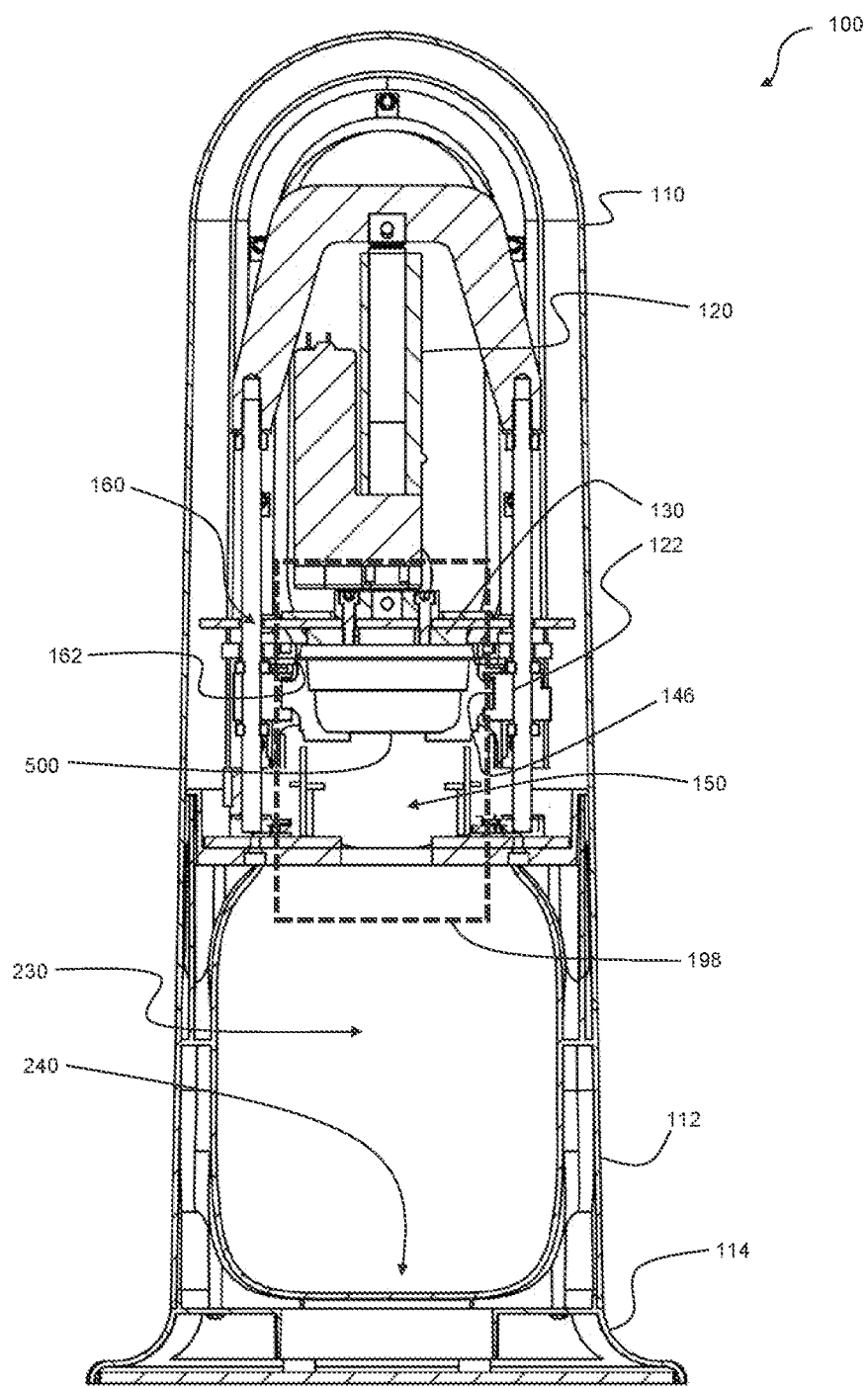
Figure 4A:
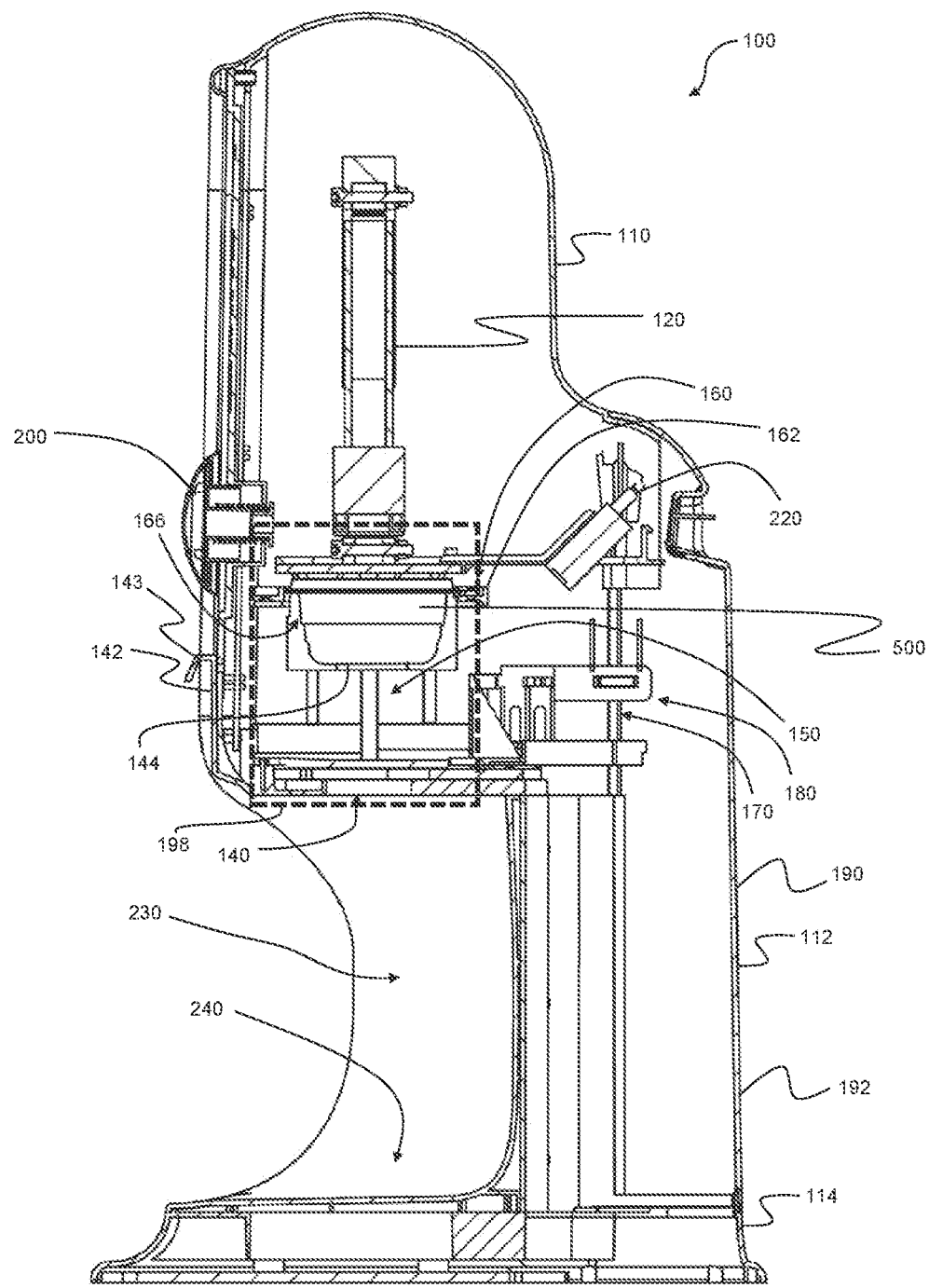
Figure 4B:
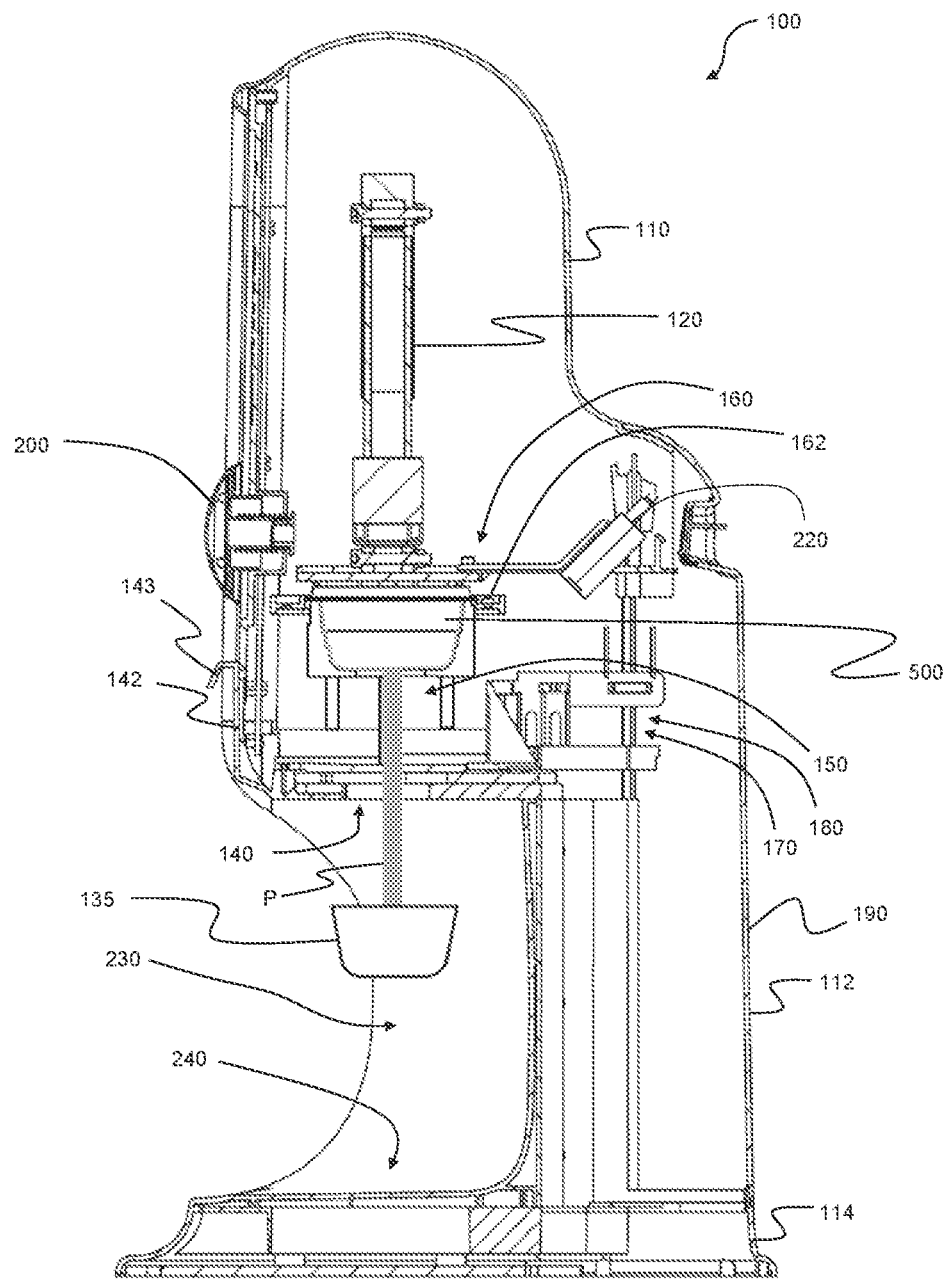

Referring now to FIGS. 3b, 4a and 4b, the actuator 120 moves the compartment 144 and hence region 140 and the container 500 so that the container 500 is forced against the compressing head 130 during a dispensing stroke. The compressing head 130 enters the interior of the container 500 at one end of the container and causes the product P to be forced out of the container 500 from an opposite end as illustrated in FIG. 4b.

The apparatus 100 has a collection region 230 where a user may collect the dispensed product P in a vessel 135 for example any of a cup, bowl, cone and plate. Below the collection region 230 there is a drip tray 240 which may catch waste product. The drip tray should be regularly cleared and cleaned to maintain hygiene levels. In the example shown in FIG. 4b, the drip tray 240 is located towards the housing base 114.

Figure 4C:
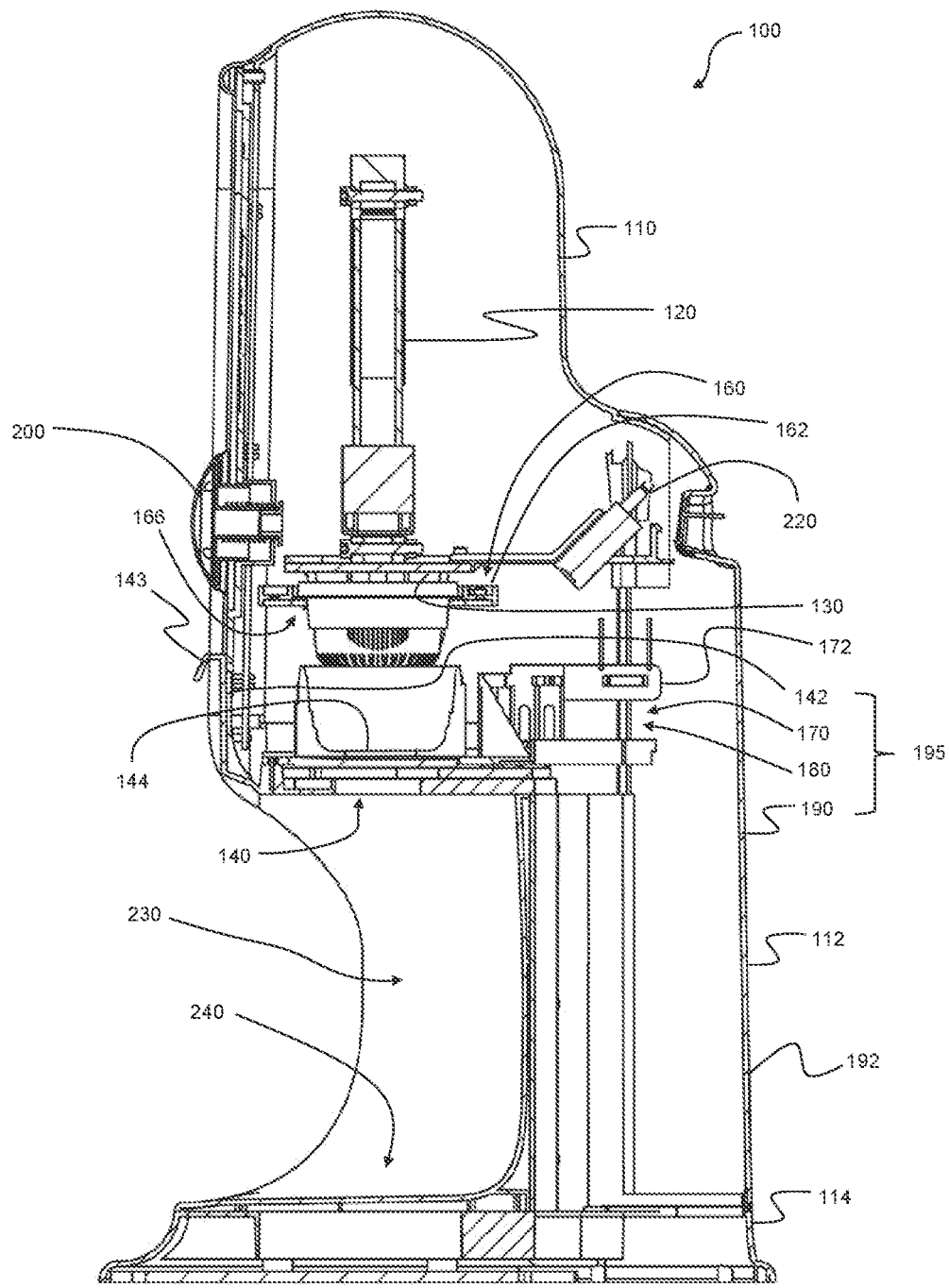

After the product P has been dispensed, the actuator 120 then moves the compartment 144 and hence region 140 in a second direction away from the compressing head 130 back to the initial position, as shown in FIG. 4c.

The region 140 is therefore moved by the actuator 120 from an initial position, through the passage 150, to a second position and then back to the initial position within the housing 110. These separate movements occur on the dispensing stroke and return stroke respectively of a dispensing cycle.

In one operating mode, the apparatus 100 is arranged to remove the container 500 from the region 140 during the return stroke to prevent the container 500 returning to the initial position with the region 140. In this operating mode the apparatus 100 has a mechanism active for automatically removing empty containers from the apparatus 100. In a different operating mode, the mechanism is inactive so that a user may remove empty containers from the apparatus 100 manually.

The mode in which the apparatus 100 is arranged to prevent the container 500 returning to the initial position with the region 140 during the return stroke is referred to as the automatic clearance mode herein. As shown in FIG. 4c, the apparatus 100 has a holding mechanism 160 and a clearance mechanism 195 which are active in the automatic clearance mode.

The holding mechanism 160 retains the empty or spent container during the return stroke thereby removing the container 500 from the compartment 144 and the region 140. The clearance mechanism 195 subsequently releases the empty container 500 from the holding mechanism 160 and clears the container 500 from a dispensing zone within the dispensing apparatus 100 the next time the drawer 142 is opened and closed to load a new full container into the apparatus 100. The dispensing zone 198 (indicated by a dashed box in FIGS. 3b and 4a) comprises the zone in which the dispensing operation takes place, namely the initial position through to the second position.

Referring now to FIGS. 5a and 5b, in this example, the holding mechanism 160 has a retainer member 162 for releasably retaining the container 500. The holding mechanism 160 also has at least one engaging element 164 for engaging a portion of the container 500 and a gap or aperture 166 arranged in the retainer member 162 through which a portion of the container 500 may pass.

In the example shown in FIGS. 5a and 5b, the holding mechanism comprises a pair of engaging elements 164 which are sprung clips arranged either side of the holding mechanism 160 on the retainer member 162 and which at least partly define the gap or aperture 166.

The holding mechanism 160 is arranged such that when the container 500 and region 140 are moved by the actuator 120 in a direction towards the compressing head 130, at least a portion of the container 500 passes through the gap or aperture 166. When the region 140 and container 500 are moved by the actuator 120 in a direction away from the compressing head 130, the container 500 is retained in the retainer member 162 and the at least a portion of the container 500 does not fully pass back through the aperture 166.

Accordingly, the retainer member 162 is arranged to allow at least a portion of the container 500 to pass through it during the dispensing stroke but to be retained in the return stroke. The engaging elements 164 of the retainer member 162 allow passage of the container 500 in the first direction but retain the container 500 when it is moved in the second direction.

As more clearly shown in FIG. 5b, the engaging elements 164 have a bevelled edge 165 against which the container 500 pushes against during the dispensing stroke. The engaging elements 164 are biased (or may be connected to a biased member), so as to yield against such movement to allow the container 500 to push past the engaging elements 164 in the direction towards the compressing head 130.

In the specific example shown in FIG. 5b, the engaging elements 164 are sprung clips which yield backwards as the container 500 passes during the upstroke and then move under a portion of the container 500 as the container 500 passes above the sprung clips 164. The engaging elements 164 may project to catch a rim of the container 500 as shown in FIG. 5b.

As shown in FIG. 5b, once the top section of the container 500 has moved past the engaging elements 164 the engaging elements 164 will then revert back to the resting position as a result of the biased nature of the arrangement. The flat surface 168 prevents the container 500 from passing the engaging elements 164 in the second direction.

The retainer member 162 may be a plate, in that the distance of the retainer member 162 in one dimension may be substantially shorter than that in the other two dimensions. The retainer member 162 may have the aperture 166 located centrally in the retainer member 162. In this manner, the central longitudinal axis of the aperture 166 may substantially align with the central longitudinal axis of the container 500. In an example, the retainer member 162 is in the form of any of a stripper plate, a guide plate, a catch plate or the like.

In a specific example, the retainer member 162 sits under a top steel plate (not shown in the Figures). During the dispensing operation, the underside of the top of the container 500 goes through the plate. When the actuator 120 returns the region 140 to the initial position the container 500 is left hanging on the retainer member 162 via engagement with the engaging elements 164.

In another example, the engaging elements 164 may not be sprung clips but may be cantilevered so as to yield in a rotational manner rather than a lateral manner under movement from the container 500 under action from the actuator 120.

Figure 6:
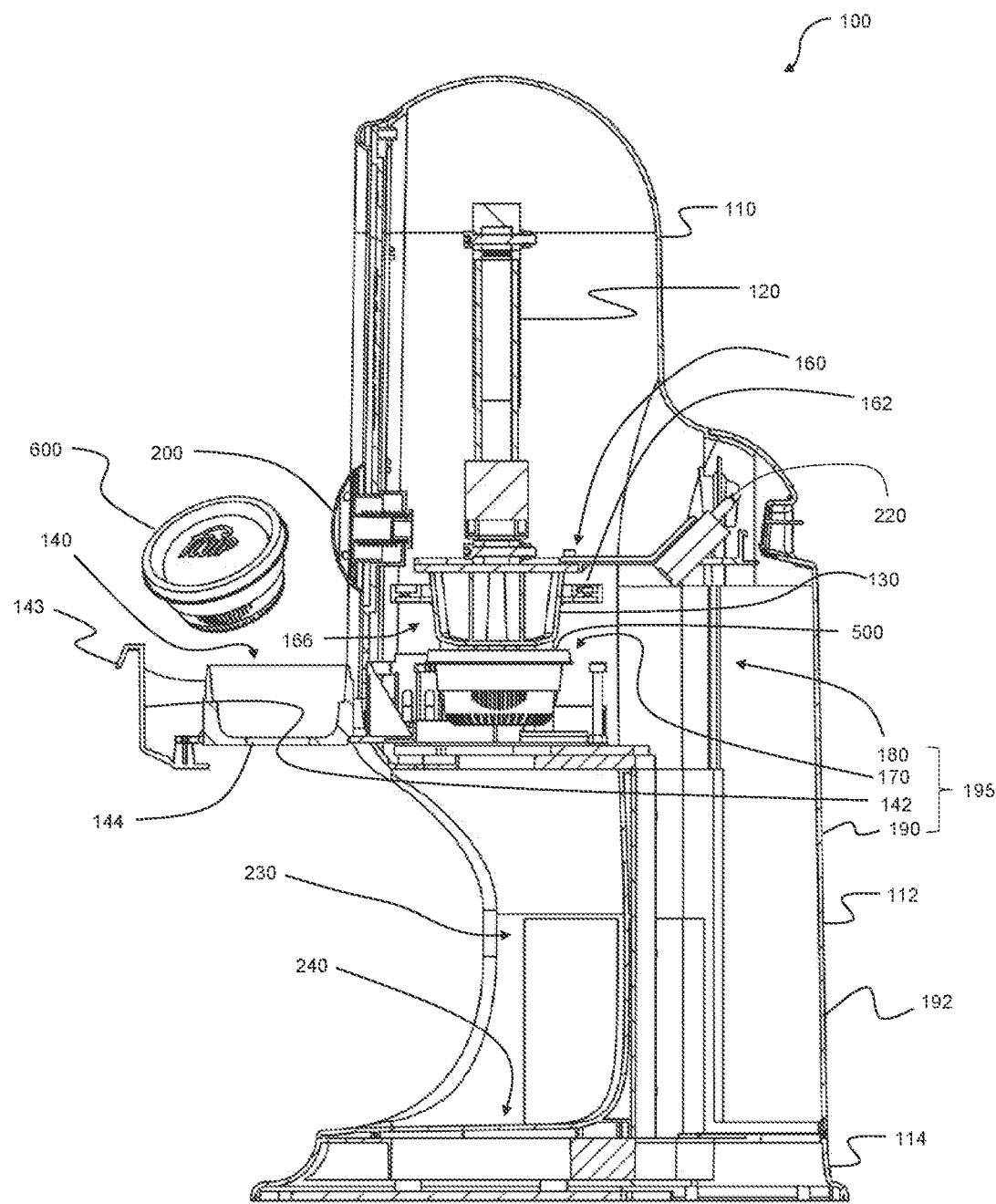
FIGS. 6 and 7a show longitudinal cross-sectional views of the example of a dispensing apparatus of FIG. 1 in use.
Figure 7A:
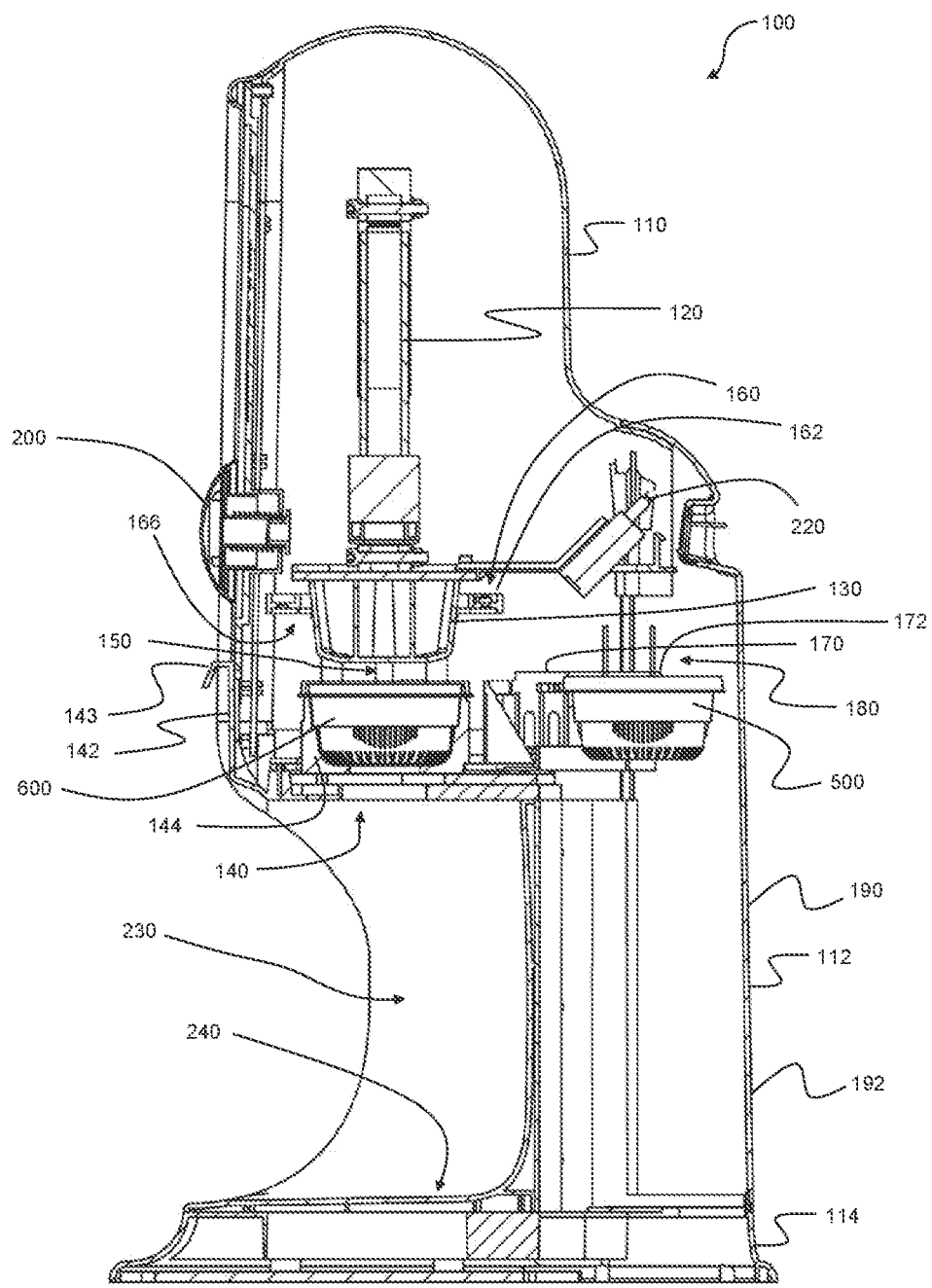

Referring back to FIG. 4c, the clearance mechanism 195 has a container outlet 180 through which a container 500 may pass. A container 500 may pass through the container outlet 180 after exiting the dispensing zone of the apparatus 100. The clearance mechanism 195 also has a collector 170 arranged to be operable between a receiving position where it receives a spent container and a depositing position where it deposits the spent container. The collector 170 may be a portion of the drawer 142 and hence referred to as a drawer portion 170. The collector 170 (or drawer portion 170) is a portion of the drawer 142 distant to the handle 143 of the drawer 142. The clearance mechanism 195 is arranged such that, when the drawer 142 is moved from the closed position to the open position and back to the closed position, a spent container 500 within the apparatus 100 moves from the retainer member 162, to the collector 170 and then through the outlet 180. Referring to FIG. 6, when the drawer 142 is in the open position, the collector 170 is in the receiving position. Referring to FIG. 7a, when the drawer 142 is in the closed position, the collector 170 is in the depositing position.

Referring now to FIG. 6 in particular, the apparatus 100 has finished a dispensing operation and the drawer 142 has been moved to the open position such that a new container 600 can be inserted into the drawer 142. The collector 170 of the clearance mechanism 195 is moved to a receiving position as the drawer 142 is moved to an open position. The collector 170 is therefore arranged to receive the spent container 500 after the product has been dispensed from the container 500. The collector 170 is arranged to be underneath the compressing head 130 when the drawer 142 is in the open position so as to be able to receive the spent container 500 once it is released from the retainer member 162. The spent container 500 is released into the collector 170 as the opening of the drawer 142 releases the engaging element 164 (see FIGS. 5a and 5b) from engaging with the spent container 500. The position of the container 500 when the drawer 142 is in the closed position is that shown in FIGS. 5a and 5b, i.e. retained in the holding mechanism 160, while FIG. 6 shows the spent container 500 having fallen onto the collector 170, i.e. released from the holding mechanism 160.

The engaging elements 164 may be released by a set of dislocating elements e.g. a set of posts (not shown) arranged at the rear of the drawer 142. The posts move forward to act on the engaging elements 164. The engaging elements 164 may be sprung clips which are moved by the posts or similar to release the spent container 500, such that the container 500 falls to the collector 170. In an example, the elements for moving the sprung clips 164 so as to release the spent container 500 are a set of rigid flaps.

Referring now to FIG. 7a, the drawer 142 has been moved to the closed position and the collector 170 and the spent container 500 are moved towards the outlet 180. The collector 170 holds or grips the container 500 as it moves the container 500 from the receiving position towards the outlet 180. The collector 170 must hold the container 500 tightly enough that the container 500 is not released during movement of the collector 170. The collector 170 should not significantly deform the container 500 while holding it. The collector 170 moves into the depositing position as the drawer 142 is moved to the closed position. In the depositing position, the collector 170 moves the container 500 through the container outlet 180 towards a chute 190.

Figure 7B:
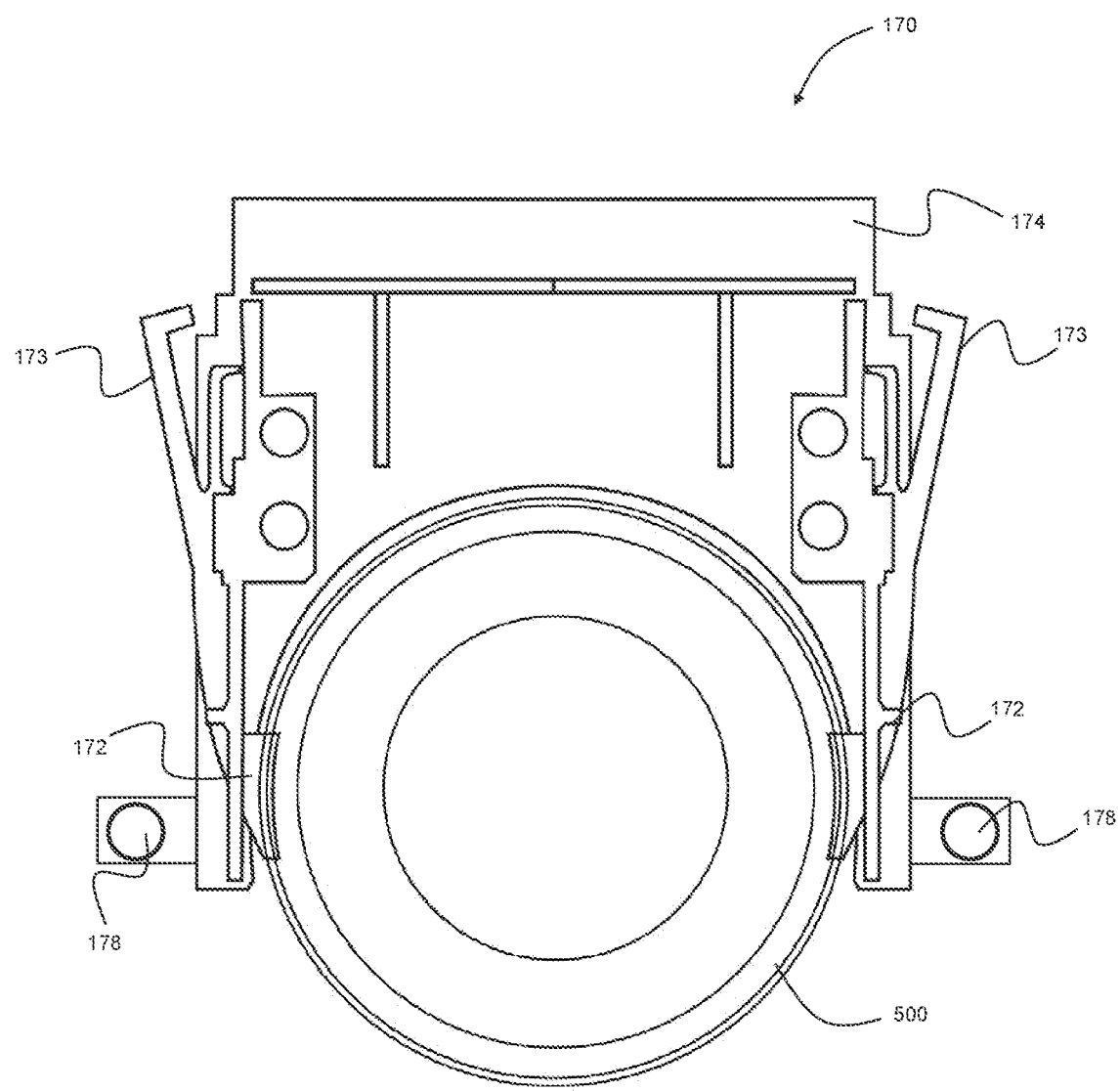
FIG. 7b shows a top-down view of an example of a container in use in a collector of the apparatus of FIG. 1.
Figure 7C:
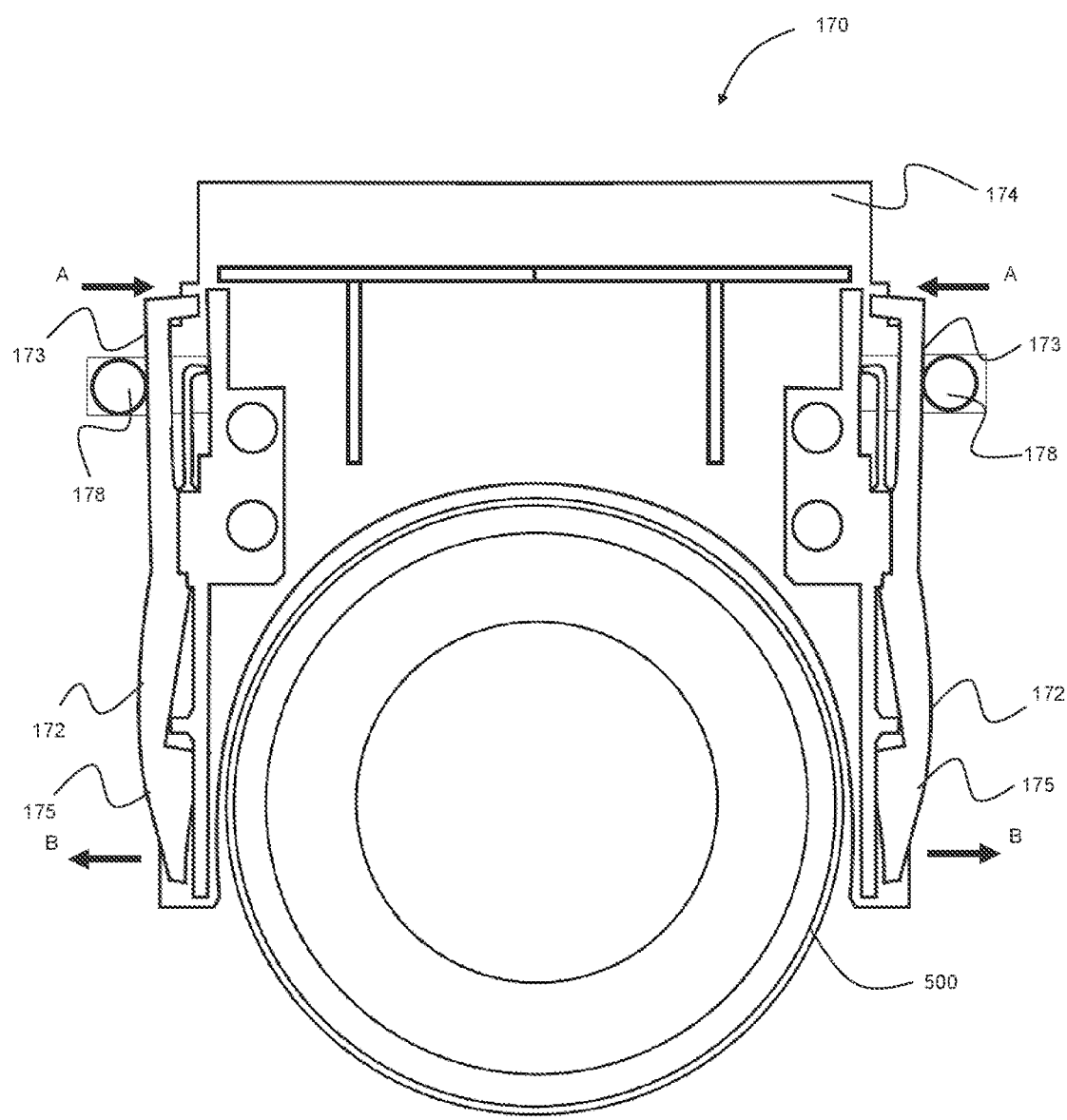
FIG. 7c shows a top-down view of an example of a container in use in a collector of the apparatus of FIG. 1.
Figure 7D:
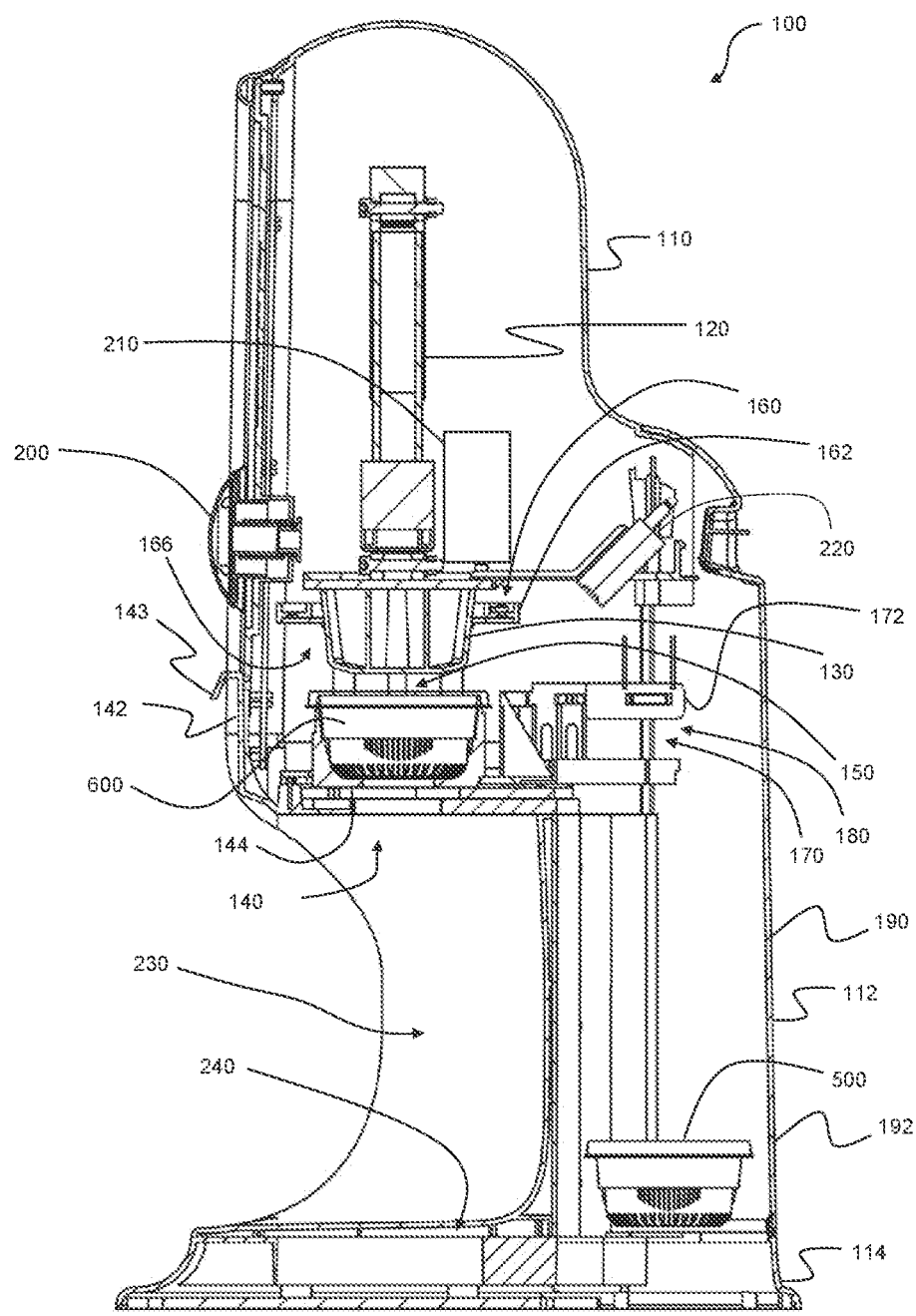
FIG. 7d shows a longitudinal cross-sectional view of the example of a dispensing apparatus of FIG. 1 in use.

Referring now to FIG. 7b, the collector 170 may comprise a pair of spaced apart arms 172 onto which the container 500 may fall once released from the engaging element 164. The arms 172 are spaced either side of a collector base 174, which runs between and below the arms 172. The arms 172 may be biased inwards to engage and abut an underside portion of the container 500 after the container 500 is released from the engaging element 164. The arms 172 have front portions 173 which extend outwardly during rest. The container 500 may be engaged underneath a lip of the container 500, as in the manner of the engaging element 162. Alternatively, the arms 172 have a separation of less than the total width of the container 500 such that the arms 172 may abut the side of the container 500, rather than under the lip of the container 500, and so that the container 500 does not fall through the collector 170 during the dispensing process. As the drawer 142 is moved to the closed position, collector 170 is moved towards the back of the apparatus 100. The arms 172 of the collector 170 move past a set of posts 178 or the like attached to a non-moving part of the apparatus 100. The front portions 173 are engaged by the posts 178 as the arms 172 are moved towards the rear of the apparatus 100 as shown in FIG. 7c. While the posts do not move, the front portions 173 are forced to move inwards by the posts in the direction A. As the front portions 173 are moved inwards, the rear portion 175 of the arms 172 holding the container 500 pivot outwards in direction B such that the spent container 500 is released from the arms 172. This is shown in FIG. 7c. The arms 172 may move about a pivot located between the front portion 173 and the rear portion 175.

These arms 172 may thereby be moved apart as the collector 170 passes through the outlet 180. This will enable the collector to deposit the container 500 through the outlet 180 into the chute 190, shown in FIG. 7a.

Figure 8:
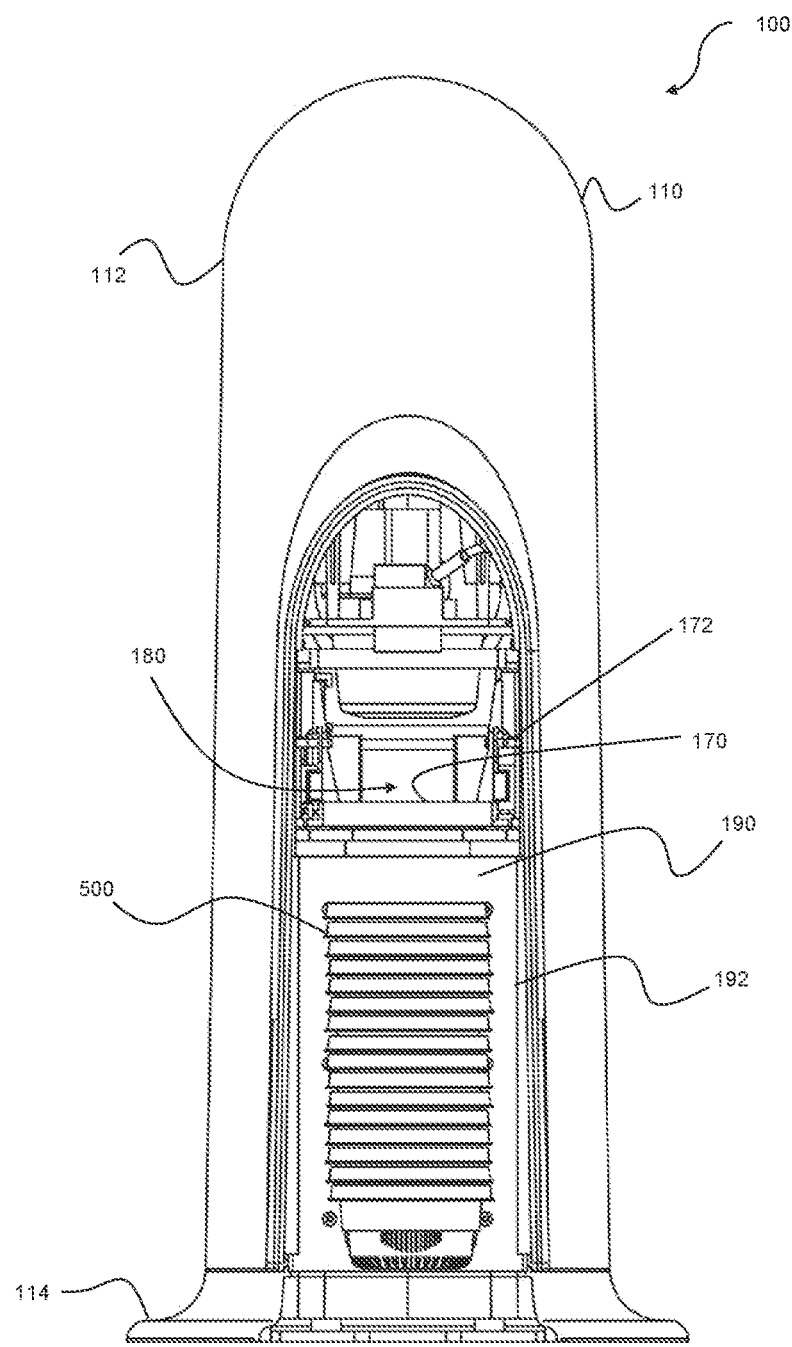
FIG. 8 shows a rear view of an example of a dispensing apparatus.

Referring now to FIG. 8, once released from the arms 172 of the collector 170 the spent containers 500 will stack in the chute 190 as shown. The chute 190 can be cleared by a user after any number of containers are moved into the chute 190. The chute 190 should be kept clean and hygienic, and regular clearing and cleaning will achieve this. The chute 190 may house a liner (not shown) for collecting used containers 500. The liner may be made of plastics or a similar material. Preferably the liner would retain both solids and liquids on one side of the liner from passing through to the other side of the liner. In this way, any product left within container 500 after movement to the chute 190 would be retained inside the liner. The liner is removable from the chute 190. Use of the liner would prevent product touching the sides of the chute 190 and therefore reduce the regularity with which the chute 190 needed to be cleaned, rather instead the liner would just be removed as a whole. The liner may be held in the chute 190 by hooks, clips, clasps, catches or the like.

In another mode the automatic clearance mode may not be active such that the retainer member 162 of the holding mechanism 160 does not retain the container 500. In this mode, the manual disposal system or manual disposal mode, the movement of the drawer 142 does not cause movement of the container 500 from the retainer member 162 to the outlet 180. In this mode, the retainer 140 does not engage the container 500 during the return stroke of the actuator 120. Rather, after the dispensing of the product, the region 140 and the spent container 500 move in the second direction towards the initial position. After the actuator 120 has returned the region 140 and spent container 500 to the initial position, a user may move the drawer 142 into the open position. The user may then manually remove the spent container 500 from the region 140 and dispose of the empty container 500. Following this, the user may insert a new container 600 into the compartment 144.

Figure 9:
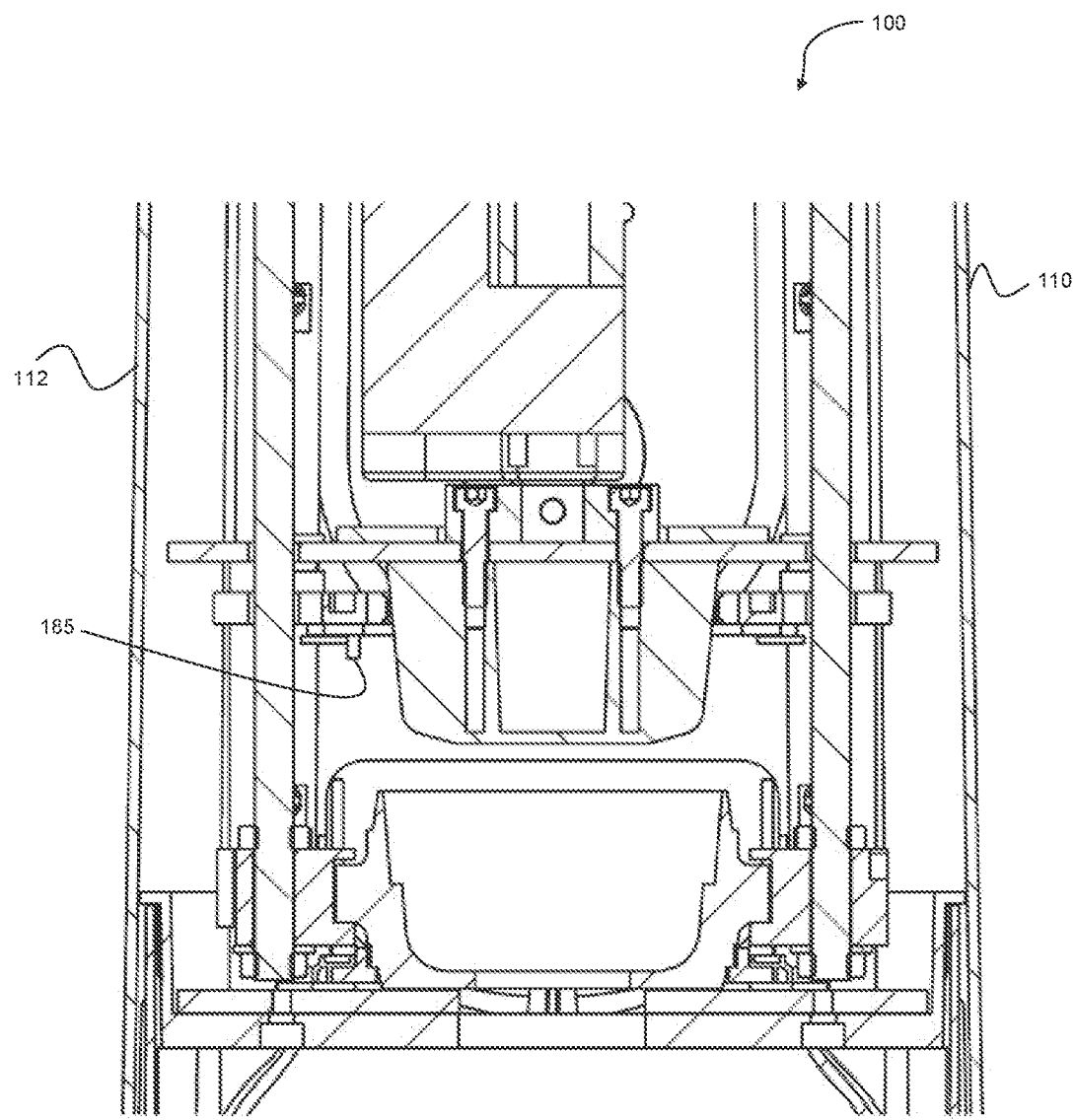
FIG. 9 shows a transverse cross-sectional view of a portion of an example of a dispensing apparatus.

Referring now to FIGS. 8 and 9, the user has the option to select between either the manual disposal system or activating the automated disposal mechanism. To activate the automated disposal mechanism there may be a mechanical switch 185 which allows the mechanism to be enabled and disabled. In the embodiment of apparatus 100 shown schematically in FIG. 9, the switch 185 is accessible via the outlet 180 on the rear of the apparatus 100. In other embodiments, the switch 185 may be an electronic switch. The electronic switch 185 may be built into a control system or panel on the apparatus 100. Instead of being activated physically, the switch 185 could be activated via biometric authentication or a passcode or similar.

When the automated disposal mechanism is active and the switch 185 is then operated, in this example, the engaging elements 164 are moved from the position in which the engaging elements 164 retain the container 500 in use to a position where the engaging elements 164 cannot retain the container 500 in use. The engaging elements 164 may be pushed against the biased member which forces the engaging elements 164 to project towards the container 500. If the distance between the engaging elements 164 is greater than the width of the container 500 after the engaging element 164 had been pushed against the biased member, the engaging elements 164 would be prevented engaging with the container 500 during the downstroke of the actuator 120. Alternatively, or additionally, this may be achieved by forcing the engaging elements 164 to pivot through 90 degrees such that the flat surface 168 of the engaging elements 164 is vertical rather than horizontal as shown in FIGS. 5a and 5b. More generally, the switch 185 results in the engaging elements 164 moving apart so that they are unable to retain the container 500 during the return stroke of the actuator 130.

Figure 10:
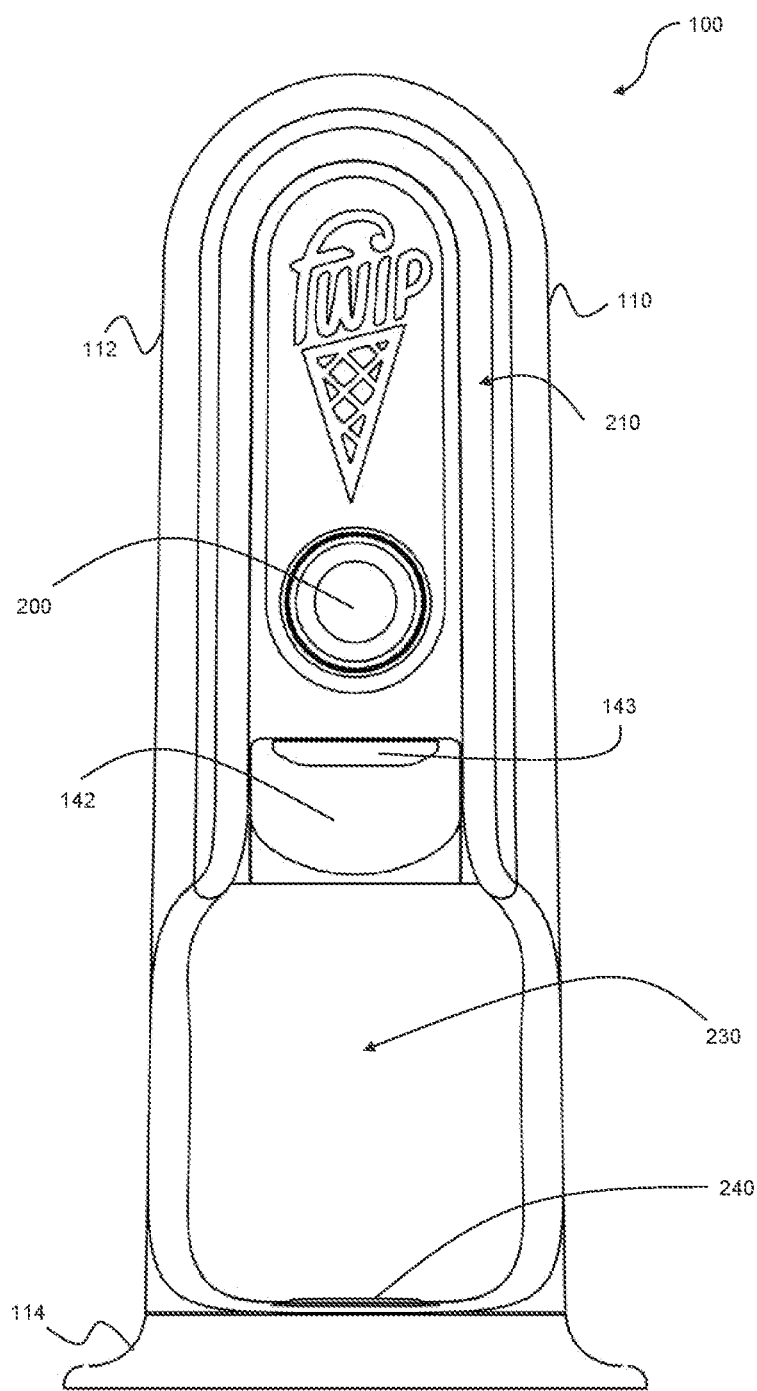
FIG. 10 shows a front-on view of an example of a dispensing apparatus.

Referring to FIG. 10, an example of the apparatus 100 has a control panel 200 through which a user may control operation of the apparatus 100. The control panel 200 may be for example an interactive display or screen, an activation switch or button. The control panel 200 in the specific example shown in FIG. 10 is arranged on a user-facing surface of the housing 110.

The control panel 200 may enable a user to switch between the manual disposal system and the automated disposal mechanism. The control panel 200 may provide feedback on the operation or status of the apparatus 100, such as providing information on an ongoing dispensing operation or a fault in the apparatus 100. The control panel 200 may also display for example step-by-step instructions as to how to operate the apparatus 100. The control panel 200 may also indicate the current stage of operation the apparatus 100 is at, so that, if a dispensing procedure is left part way through, a user is informed of this and can take suitable action. For example, if a container 500 is input into the apparatus 100 but the dispensing is not initiated, a subsequent user knows to remove the container 500 currently in the apparatus 100 before inserting one of their choice.

After initiating the operation, the control panel 200 may display the time left until the dispensing is complete. The control panel 200 may also display the time since the previous stage of operation was completed. In the example above, wherein a user has input a container 500 into the apparatus 100 without initiating the dispensing process and a subsequent user arrives after an extended period of time, the subsequent user knows to dispose of the container 500 rather than e.g. place the container 500 back into a freezer.

The control panel 200 may also display information of the remaining capacity of the chute 190. In an example, the control panel 200 has a display which gradually lights up as the dispensing operation completes, such that the design is fully lit at the completion of the dispensing operation. The control panel 200 can also display error information to a user, indicating the location of the error and the steps required to rectify the error.

In a specific example, if one container suitable for use with the apparatus 100 contains a product which requires a greater force to dispense it than does the product of another container, the user may be able to input the product type into the control panel 200. The control panel 200 may then send information to a controller 210 which then sets operation conditions of the apparatus 100 based on the information.

The controller 210 may be part of an operation management mechanism for setting operating conditions for the apparatus 100. The controller 210 may receive information related to one or more predetermined conditions and set operation conditions accordingly. This may relate to the total force output by the actuator 120, the length of time over which the actuator 120 acts, the total distance over which the actuator 120 acts and/or other operating conditions.

Figure 11:
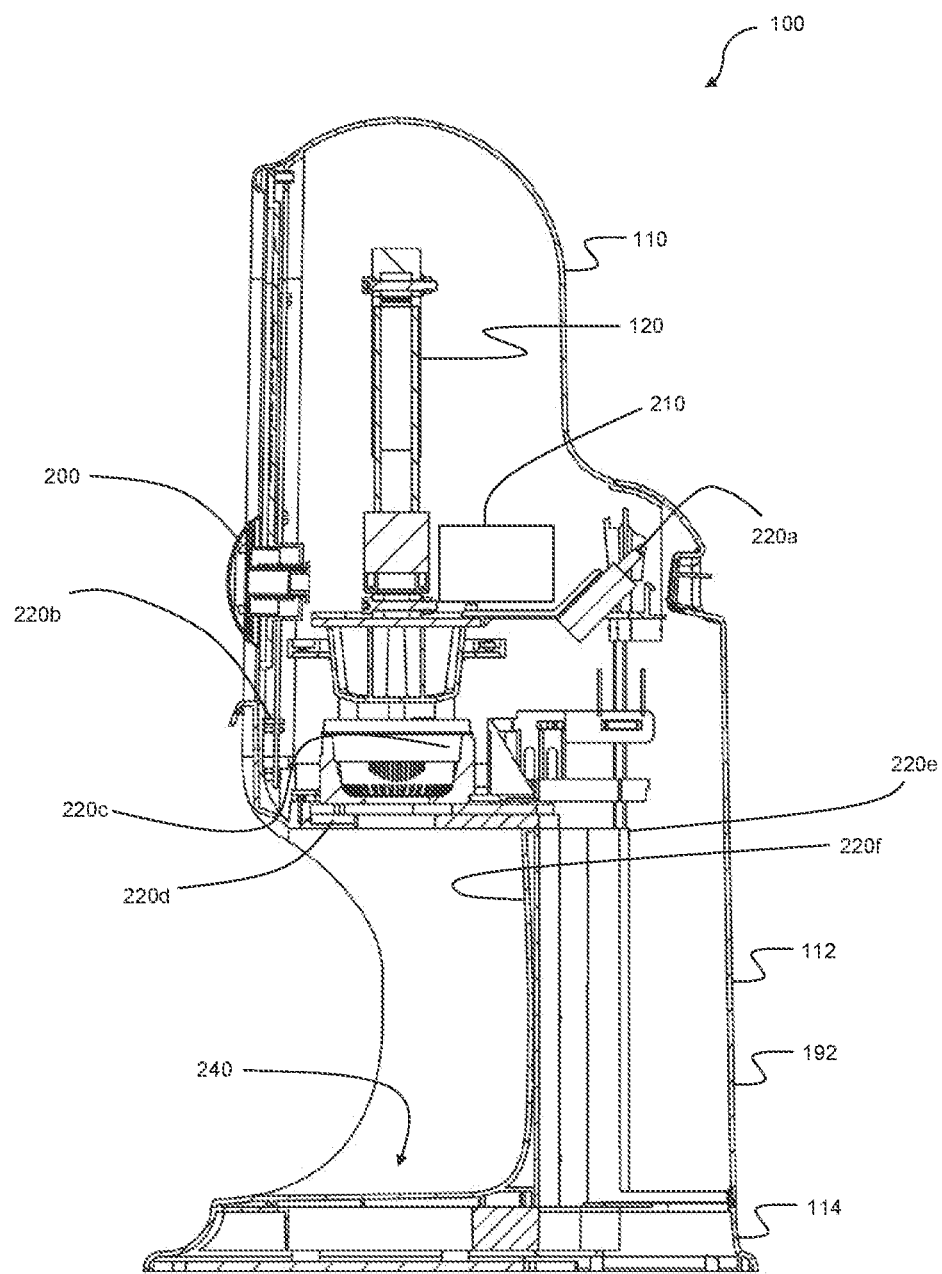
FIG. 11 shows a longitudinal cross-sectional view of the example of a dispensing apparatus of FIG. 1.

Referring now to FIG. 11 in particular, the apparatus 100 may have a number of sensors or detectors 220a, 220b, 220c, 220d, 220e, 220f that provide information to the controller 210 which then controls the apparatus 100 based on that information. The sensors or detectors 220a, 220b, 220c, 220d, 220e, 220f may send the information to the controller 210 which then programs the operation of the apparatus 100 based on the information. The information obtained by at least some of the sensors 220a, 220b, 220c, 220d, 220e, 220f may be regarding the type of food product in the container 500 or temperature information about the food product. The controller 210 and sensors 220a, 220b, 220c, 220d, 220e, 220f may be arranged as part of an operation management system.

In this example, the sensor or detector 220a is for detecting the type of product in the container and providing information identifying that product to the controller 210. For example, if the product is a frozen or semi-frozen confectionary such as ice cream or yogurt, the information may identify the particular flavour, (e.g. strawberry, mint, chocolate etc) of the ice cream or yogurt. Based on this information, the controller may set appropriate operating conditions for the actuator 120, for example, the force to be output by the actuator 120 to dispense the product, the length of time over which the actuator 120 acts, or the total distance over which the actuator 120 acts that are appropriate for that product. For example, when the product is a frozen yogurt or ice cream the optimum actuator operating conditions for the dispensing of the product (in particular the extrusion force to be applied by the actuator 120) may vary dependent upon the nature of the frozen yogurt or ice cream, for example the flavour. Accordingly, the controller 210 may set these optimum operating conditions based on the information provided by the sensor or detector 220a.

In a specific example, the sensor or detector 220a is a barcode reader for reading a barcode which may be located on the container 500. This may be on an external facing surface of the container 500 for ease of identification. The barcode contains the information on the product within the container 500 which the controller 210 then uses to set operation conditions. Other technology that may be used for obtaining information on the container 500 or apparatus 100 includes RFID tags, MFID tags, QR codes, infra-red sensors, optical sensors, ultra-violet sensors and colour readers among others.

The sensor 220b senses whether the drawer 142 is properly closed or not and the controller 210 may prevent the apparatus 100 from attempting to dispense a product if the sensor 220b indicates that the drawer is not properly closed. In an example, the sensor 220b may be a pressure detector that detects when the drawer is pushed up against it. Alternatively, when the drawer 142 is fully closed it may complete an electrical circuit and this is detected by the sensor 220b.

In this example, the sensor 220c is an optical sensor or may be a colour sensor that can recognise the colour of the container 500 or a coloured portion which provides information on the product in the container 500. The sensor 220c may then send this information to the controller 210. Alongside the barcode sensor 220a, this may enable the controller 210 to program suitable operation conditions. The barcode sensor 220a and light sensor 220c may be used in tandem to provide a double check prior to the operation conditions being set. Alternatively, only one or the other of sensor 220a and sensor 200c may be used to save space within the apparatus 100. In the event that the two sensors 220a, 220c provide differing information on the product in the container 500, the controller 210 may prevent operation of the apparatus 100.

In one example, the apparatus is provided with a first optical waveguide (not shown), for example a first light tube or light pipe, for guiding light form a light source, for example, an LED, so that the light illuminates a required part of the container 500. The apparatus may further be provided with a second such optical waveguide (not shown) for guiding light reflected back off the illuminated part of the container 500 to the optical sensor 220c.

Advantageously, this arrangement allows the optical sensor 220c, which may be sensitive to vibration or other types of movement, to be located in the apparatus 100 at a location that is remote from the container 500 and hence remote from moving parts in the apparatus 100. Use of optical waveguides in this way also ensures that light is delivered to and receive from the container 500 with minimum loss of signal.

In this example, the sensor 220d detects whether the container 500 is ready for a product to be dispensed from it. For example, the container 500 may comprise an aperture (not shown) in its base through which the product is dispensed and the container 500 may be provided with packaging (not shown), e.g. a sticker or the like sealing the aperture to keep the product fresh. The aperture must be open in order for the product to be dispensed (e.g. a user must remove a sticker before use) and the sensor 220d detects whether or not this is the case. If the sensor 220d senses that the aperture is closed then controller 210 may prevent the apparatus 100 from attempting to dispense a product. In an example, the detector 220d may be a photodetector which can emit light and then detect the more specular reflection of light returning off the surface of packaging as different to more diffuse reflection of light returning off the surface of the product.

In another example, the sensor 220d may be an inductive sensor for sensing if removal of metallic packaging, for example, a metallic strip covering the aperture in the container 500, has occurred prior to insertion of the container 500 into the apparatus 100. In the event that the sensor 220d senses that the metallic strip is still covering the aperture in the container 500 as it enters the apparatus 100 and passes over the sensor 200d, it may send a message to prevent initiation of a dispensing operation.

The sensor 220e senses if the chute 190 is full or not. The sensor 220e may be a laser gate which is continuously broken once the height of stacked spent containers reaches a certain height indicating the chute 190 is full.

The sensor 220e may also detect if a container 500 has been correctly disposed from the holding mechanism 160 to the chute 190 in the automatic disposal mode. The sensor 220e would detect the container 500 passing through the outlet 180 into the chute 190 by, for example, a brief break in the laser gate. If the sensor 220e does not detect the container 500 passing into the chute 190 after a dispensing operation, the sensor 220e may send this information to the controller 200 and the controller 200 would register an error and inform the user. A check could then be performed, which could avoid a malfunction escalating to an event requiring professional maintenance.

The sensor 220e may be a series of laser gates located at different levels in the chute 190 which are able to provide information to the controller 210 on the remaining capacity in the chute 190. The controller 210 may then program a notification to be displayed on the control panel 200 to alert a user that the chute 190 needs to be cleared and cleaned. The chute 190 may have some alert system on the chute 190 itself, such as a light display. The display may be controlled by the controller 210 to display, for example, a red light when the chute 190 is full and for example a green light when the chute 190 is not full. The light may pass slowly from green to red as the chute 190 fills. Alternatively, a number of lights may light up one after the other and once all lights are lit the chute 190 will need to be emptied before any further dispensing operations may take place. Any colour scheme may be used to indicate the number of containers 500 located within the chute 190.

In this example, the sensor 220f senses if an object (not shown), for example a cup or the like, is located in the collecting region 230 to receive a dispensed product. Again, if the sensor 220f indicates to the controller 210 that no object is present in the collecting region 230 the controller 210 may prevent the apparatus 100 from attempting to dispense a product. In an example, the sensor 220f may be a proximity sensor, or a movement sensor, for detecting the presence of a collecting item. Proximity sensors include IR proximity sensors.

Accordingly, it will be understood that the apparatus 100 may have a number of sensors or detectors 220a, 220b, 220c, 220d, 220e, 220f to sense or detect a feature of a container 500 prior to initiation of the dispensing process, such as whether a container 500 has been input into the apparatus 100. The sensors or detectors 220a, 220b, 220c, 220d, 220e, 220f may additionally or alternatively sense or detect when predetermined conditions of the apparatus 100 or container 500 are satisfied prior to initiation of the dispensing process. The sensors or detectors 220a, 220b, 220c, 220d, 220e, 220f may send the information to the controller 210 which then programs operation of the apparatus 100 based on the information. The controller 210 may communicate with or access a local or remote database prior to setting the operation of the apparatus 100. The controller 210 may read operation conditions from the database.

If the sensors or detectors 220a, 220b, 220c, 220d, 220e, 220f obtain information that a predetermined condition has not been satisfied, the controller 210 may prevent operation of the apparatus 100 so that if a user attempts to dispense a product, for example, by pressing a 'start dispensing' control on the apparatus 100, the apparatus does not attempt to dispense the product. The conditions may include any of: a non-suitable container has been placed into the region 140; a container has not been placed into the region 140 correctly; and, a container has not been prepared properly prior to activation for example having packaging or stickers removed or similar. A number sensors or detectors 220 may be positioned advantageously around the region 140 when in the active position so as to obtain information regarding the container 500.

When the controller 210 receives the information regarding the container 500 it may also cause the control panel 200 to display a message to the user, such as "enjoy your *insert product or product flavour here*" or to play a jingle through speakers of the apparatus 100.

Figure 12:
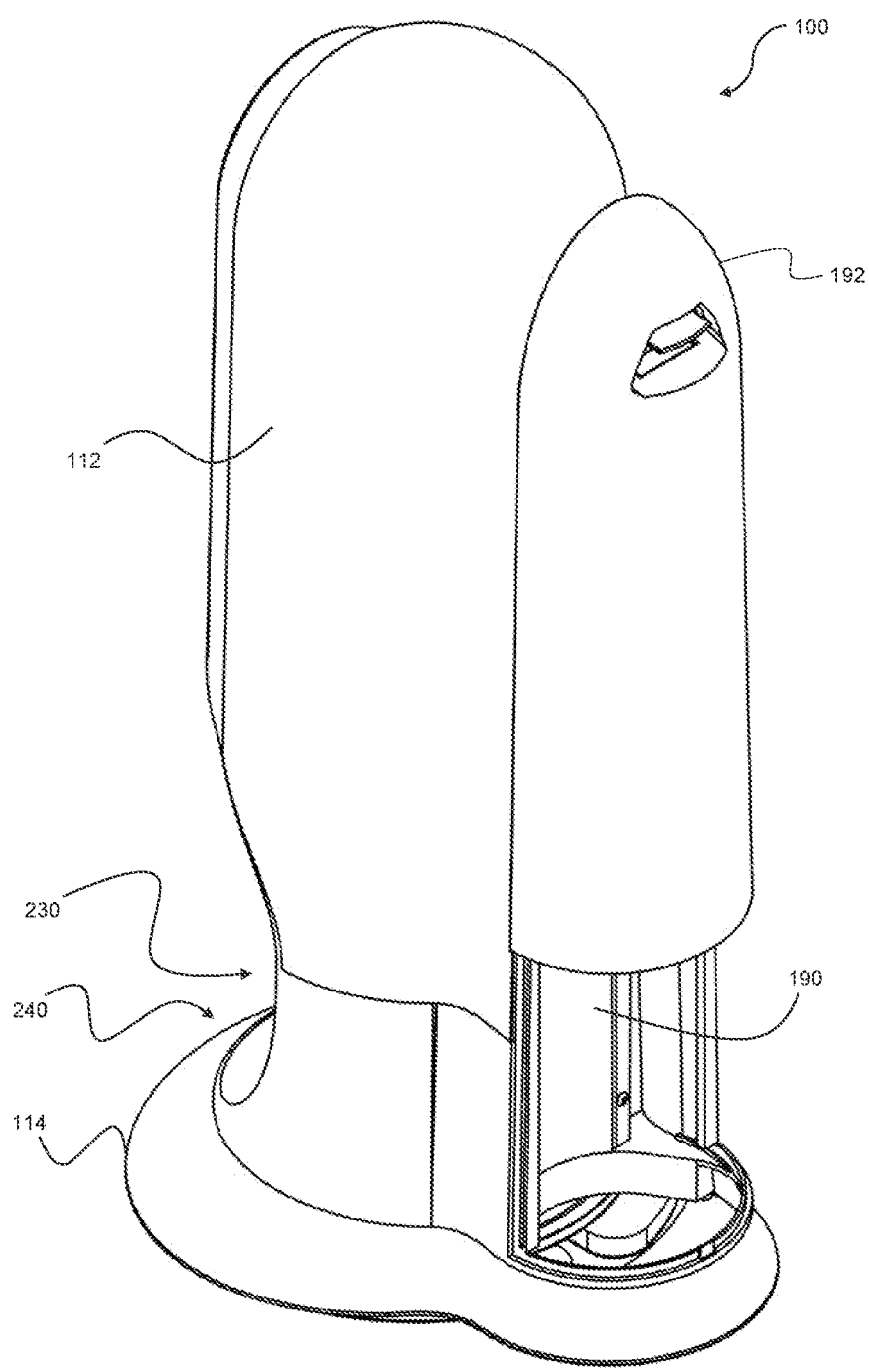
FIG. 12 shows a rear perspective view of an example of a dispensing apparatus.

As shown in FIG. 12, the apparatus 100 has a door 192 for accessing the chute 190. The door 192 may be a sliding door which enables a user access to the chute 190 to clear out the containers and to clean the chute 190. In another example, the door 192 may be attached to a hinge which enables a user to open the door 192. The door 192 may be partially or fully removable from the apparatus 100. The door 192 may be part of the housing body 112.

Figure 13A:
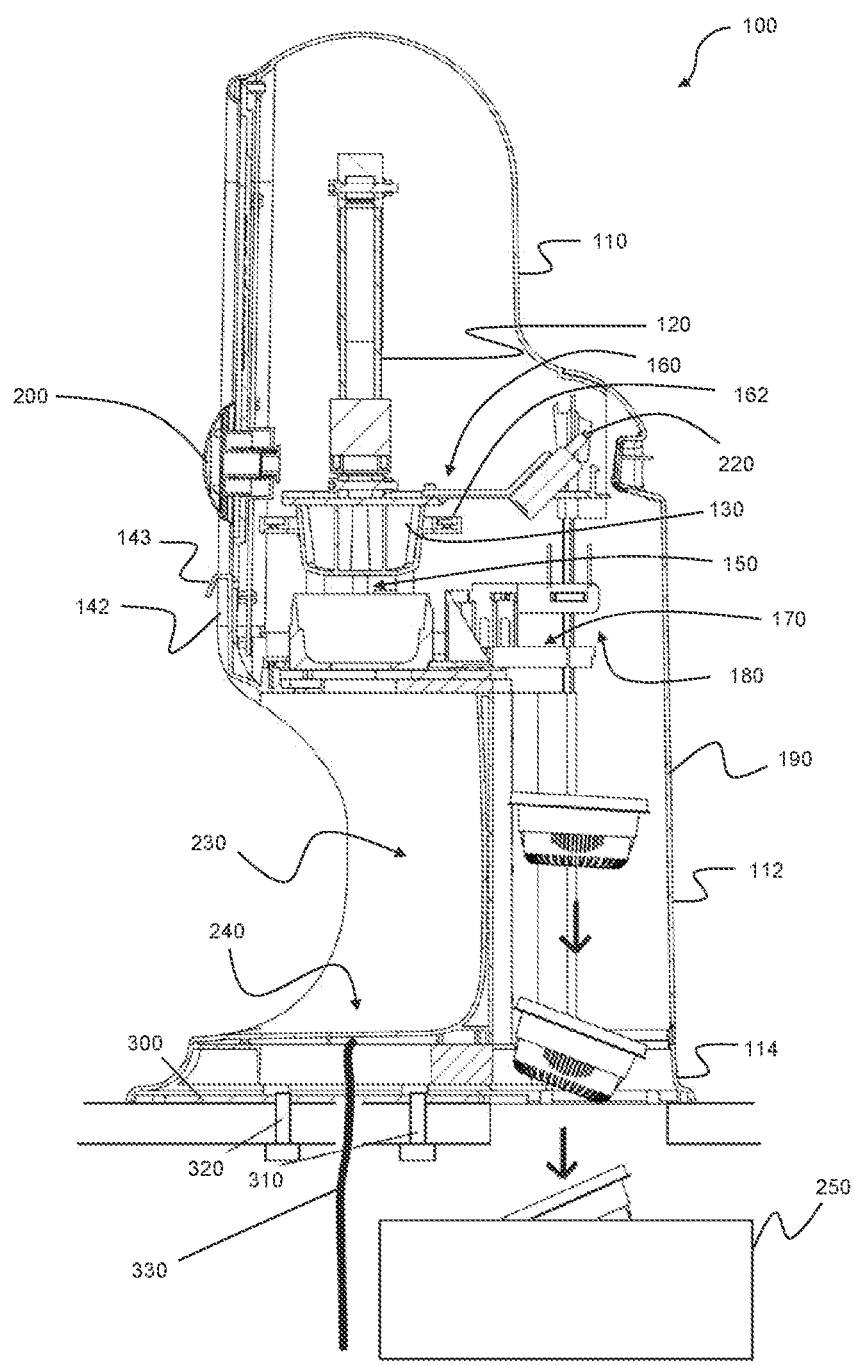
FIG. 13a shows a longitudinal cross-sectional view of an example of a dispensing apparatus in use.

In the example shown in FIG. 13a, the apparatus 100 is bolted to a surface 300 and the chute 190 may connect to a larger containment area 250 under the surface 300. The larger containment area 250 may be a bin or similar. The apparatus 100 may be bolted to the surface 300 by bolts 310, 320 or other suitable joining means. Power cable 330 can be seen to run through a gap in the surface 300. The larger containment area 250 would then be cleared by a user when required. The apparatus in FIG. 13a does not require a door to provide access to the chute 190 for clearing containers from the chute 190. In an example, the apparatus 100 may be connected to a mains power source via a power cable 330. In another example, the apparatus 100 may be powered via an internal power source for example one or more batteries.

Figure 13B:
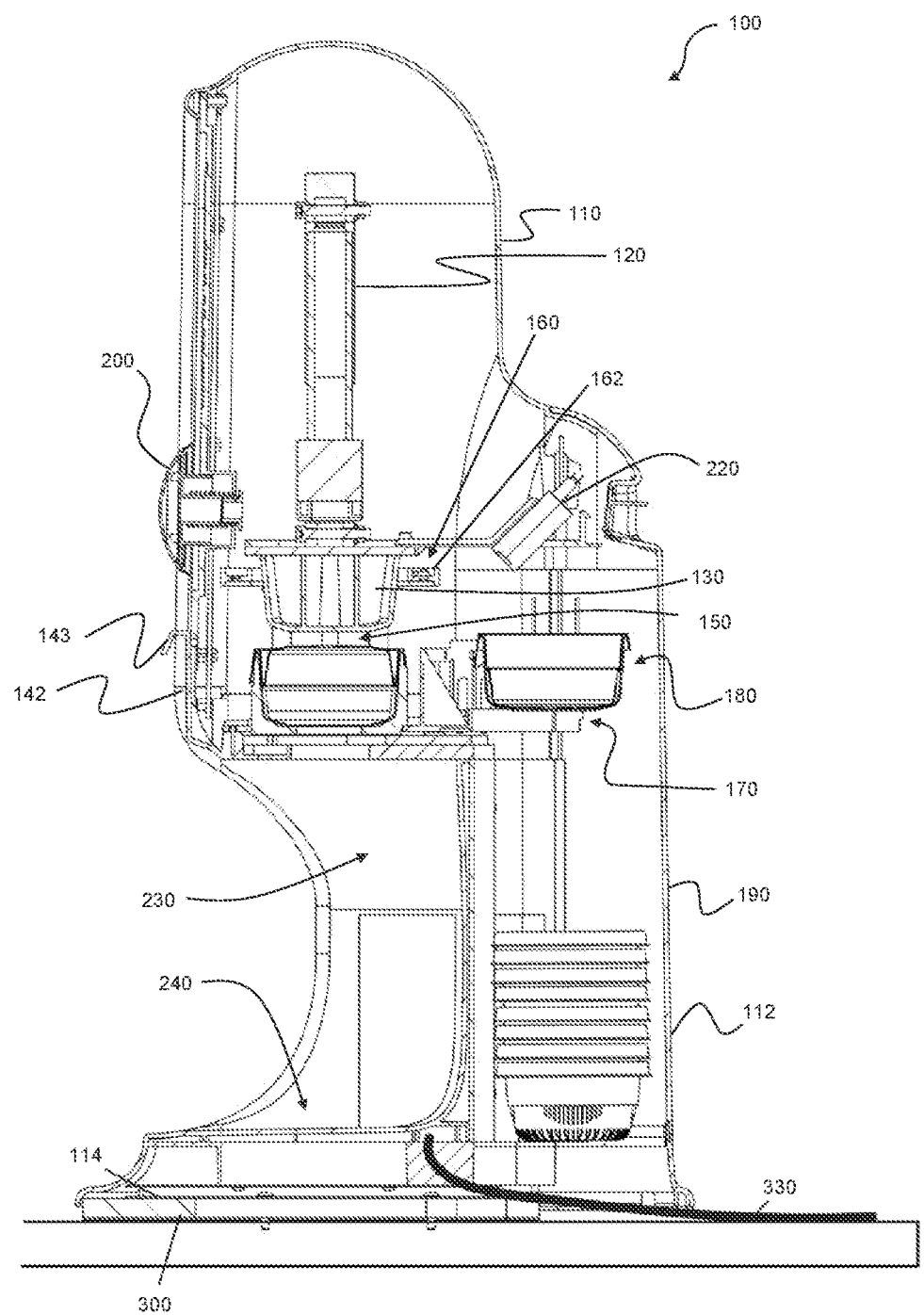
FIG. 13b shows a longitudinal cross-sectional view of an example of a dispensing apparatus in use.

In FIG. 13b, the apparatus 100 has a rotatable housing base 114 which provides a user access to the drawer 142 from any angle. The rotatable housing base 114 also increases the ease with which a user can access the chute 190 to clear out used containers 500 or for performing maintenance to the apparatus 100. This enables the apparatus 100 to be arranged on a counter top facing a customer but, prior to initiation of operation, an apparatus-operator may turn the apparatus 100 such that the drawer 142 faces them and the operator may perform the dispensing and collecting operations. The apparatus 100 may then be rotated back to face the customer. Prior to the dispensing operation, a customer may select a container 500 from a nearby refrigeration unit. The user may then provide this to the operator to use with the apparatus 100. The power cable 330 in this example runs along the top of the surface 300 from underneath the apparatus 100.

In an example, the apparatus 100 of FIG. 13b may rotate up to 5°. In another example, the apparatus 100 of FIG. 13b may rotate up to 90°. In another example, the apparatus 100 of FIG. 13b may rotate up to 135°. In another example, the apparatus of FIG. 13b may rotate up to 180°. In another example, the apparatus 100 of FIG. 13b may be freely rotating.

The apparatus 100 shown in FIG. 13b may have an internal locking system (not shown) which can be engaged to prevent the rotation of the housing base 114. This can be engaged once the housing body 112 has been rotated to a desired angle, but where the housing 110 needs to be secured whether temporarily or on a more permanent basis. The internal locking system (not shown) may be a frictional brake or an activatable projection (not shown) which can project into a recess to prevent rotation when activated.

Figure 14A:
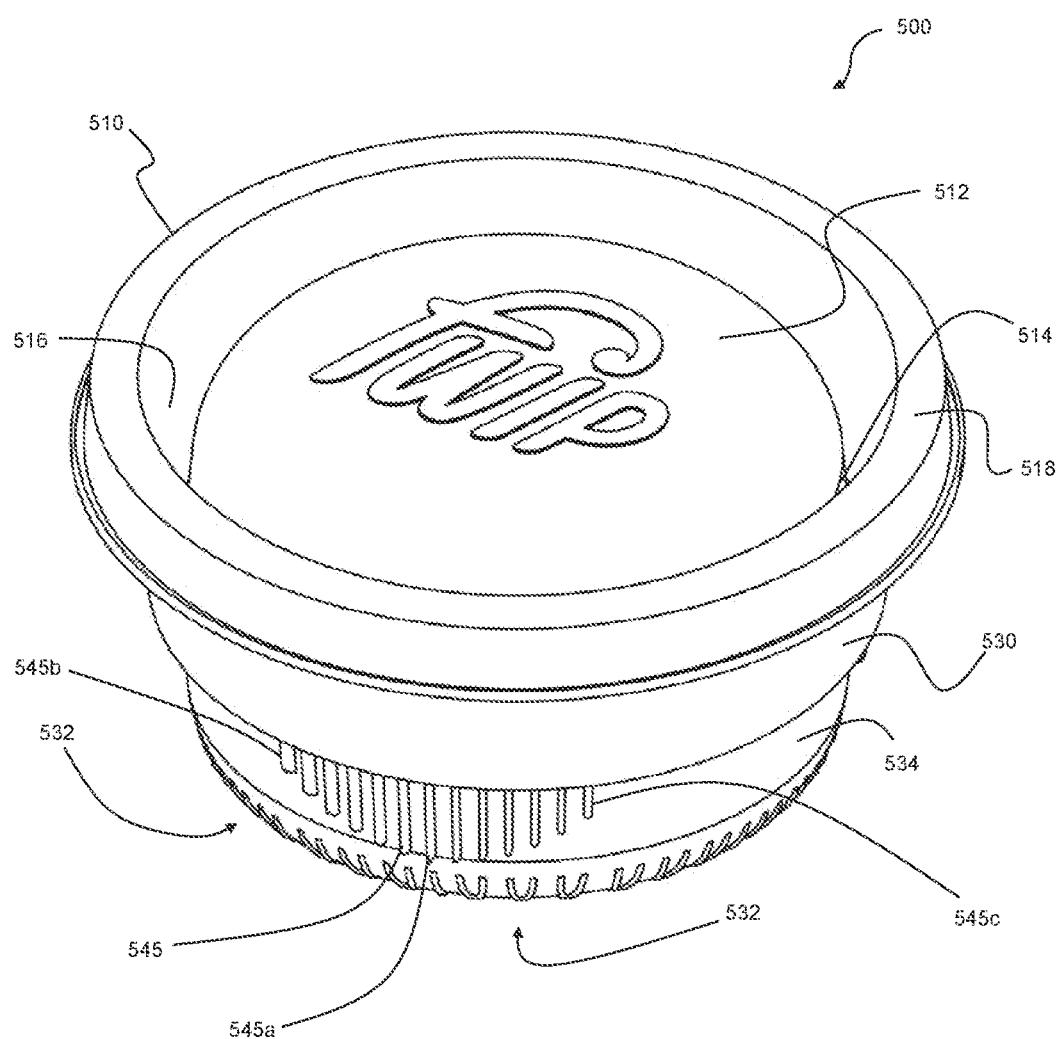
FIG. 14a shows a perspective view of an example of a container for use in a dispensing apparatus before use.
Figure 14B:
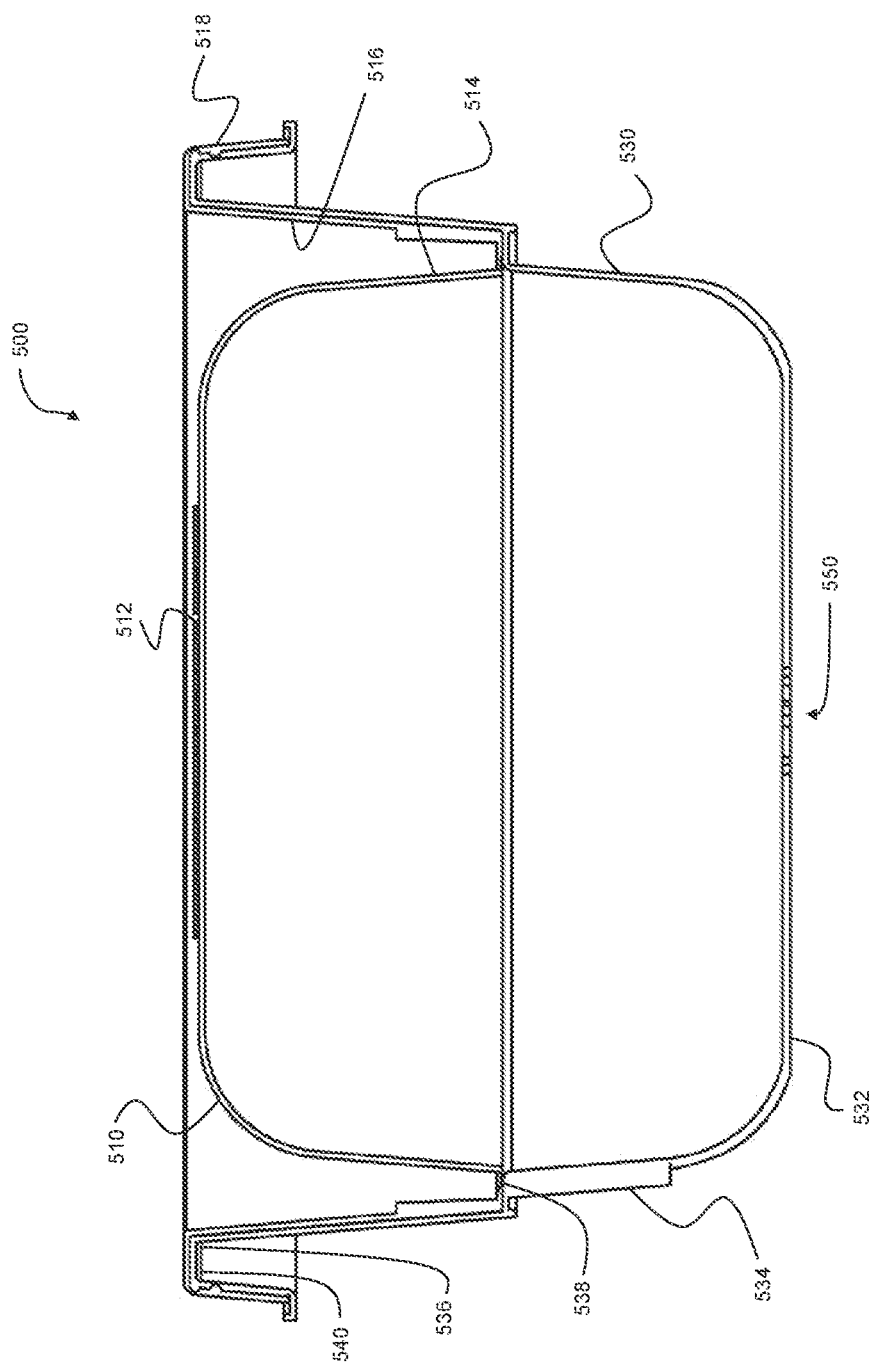

Referring now to FIGS. 14a and 14b, there are shown views of a container 500 before the dispensing operation. In a specific example, the container 500 may have a lid 510 which may be compressed during the dispensing operation to fit within the body 530 of the container 500. During the dispensing operation the lid 510 is compressed by the compressing head 130 with a shape similar to, but slightly smaller than, the body 530 of the container 500. During this compression, the product within the container 500 is forced out of the container 500 through a container outlet 550 in the base 532 of the container body 530 as the lid 510 is forced into the body 530.

In the example shown in FIGS. 14a and 14b, the lid 510 comprises a top surface 512, a folding arm portion 514, a joining portion 516 and an overlapping edge portion 518. The compressing head 130 primarily contacts the top surface 512; the majority of the contacting surface of the lid 510 with the compressing head 130 is the top surface 512. The folding arm portion 514 connects to the top surface 512. The folding arm portion 514 bends during the dispensing operation. The joining portion 516 joins the overlapping edge portion 518 to the folding arm portion 514. The overlapping edge portion 518 overlaps an upper edge of the body 530 and may provide a snap fit or a close friction fit with the body 530.

The body 530 of the container 500 has a container base 532 and a side 534 which projects from the container base 532. The side 534 terminates at an edge 536 of the body 530. The edge 536 then connects to a lip 540 of the body 530. In the specific example shown in FIGS. 14a and 14b, the body 530 has a kink 538 in the side 534. The kink 538 provides a surface against which a portion of the joining portion 516 of the lid 510 can lie flush. This arrangement may prevent product exiting from the container 500 in an undesirable manner, e.g. out through the sides of the container 500. The kink 538 provides a support against which the top surface 512 and folding arm portion 514 of the lid 510 can be forced into the body 530.

The body 530 of the container 500 has at least one group or series of projections 545 arranged on the side 534. The series of projections 545 may correspond with one or more recesses in the compartment 144 of the drawer 142 such that the container 500 is only fully or properly inserted into the compartment 142 when the projections 545 on the container 500 abut the recesses of the compartment 144. The series of projections 545 shown in FIG. 14a is arranged such that the middle-most projection 545a in the series is longer than an outer-most projection 545b, 545c in the series. The corresponding recess in the compartment 144 may be in the shape of a dip to receive the series of projections 545. Alternatively, or additionally, the container 500 may have a singular recess or a series of recesses which correspond with a singular projection or a series of projections in the compartment 144. A formation of projections and recesses may be present on either the body 530 of the container 500 or the compartment 144 for corresponding with a complementary shaped formation of recess and projections on the other of the body 530 of the container 500 or the compartment 144. The formation of projections and recesses may be repeated on the container 500 and compartment 144. In a specific example, there are at least three sets of the formation. If the formations are the same, this arrangement provides the container 500 with three acceptable orientations in which it can be placed into the compartment 144 of the drawer 142.

In an example, the container 500 cannot be received in the compartment 144 if the respective formations are not engaged which may result in the drawer 142 of the apparatus 100 being prevented from being closed. This prevents initiation of a dispensing operation.

A container outlet 550 is located in the container base 532 in FIGS. 14a and 14b. The container outlet 550 is located centrally in the container base 532. To ensure the most product may be extruded from the container 500, the compressing head 130 of the apparatus 100 described herein may have a slightly extended portion for pressing into the outlet 550 of the container 500. In the example shown, the outlet 550 is centrally located and the corresponding extended portion of the compressing head 130 may be accordingly located. The extended portion may be a small protrusion such as a nipple or a wider feature which may be curved in the shape of a mushroom.

The folding arm portion 514 projects substantially downwardly from the top surface 512 towards the container base 532 of the body 530. The joining portion 516 then projects substantially upwardly to a level similar to, or the same as, that of the top surface 512 and the edge 536 of the side 534 of the body 530. The overlapping edge portion 518 then projects substantially downwardly over the edge 536 of the side 534 of the body 530. The overlapping edge portion 518 may abut the lip 540 of the body 530.

Figure 15A:
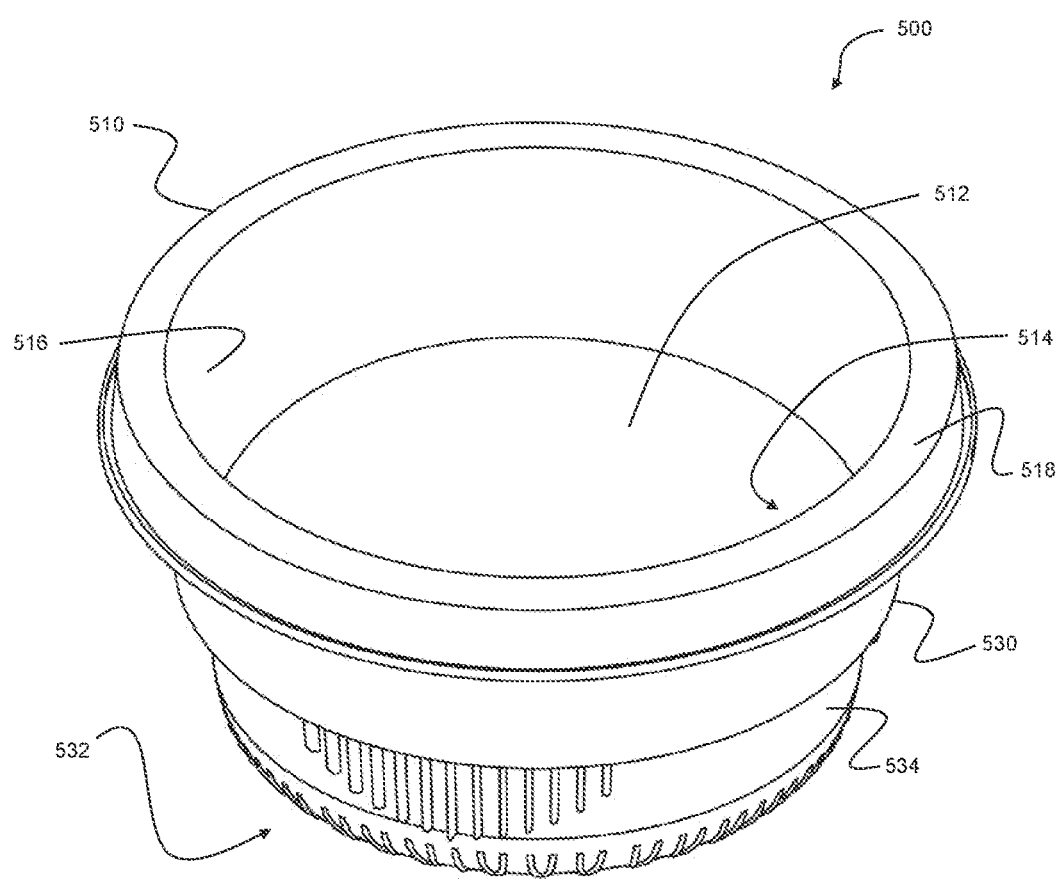
FIG. 15a shows a perspective view of the container of FIG. 14a after use.

The transverse cross-section of the container 500, shown in FIGS. 14a and 15a, is substantially circular. In other examples, the transverse cross-section of the container 500 may not be circular. In other examples, containers 500 may take the shape of, or have a cross-section of, a cylinder, an oval, a cone, a ball, a pouch or the like.

The container 500 may be made from injection moulding of plastics or other suitable materials. The injection moulding, in a specific example, is performed at two points at either side of the container outlet 550. This may leave the container 500 with two injection points either side of the container outlet 550. The first and second injection points may be incorporated into a design to reduce the visual impact. The first and second injection points may be covered by a design to reduce the visual impact.

Figure 15B:
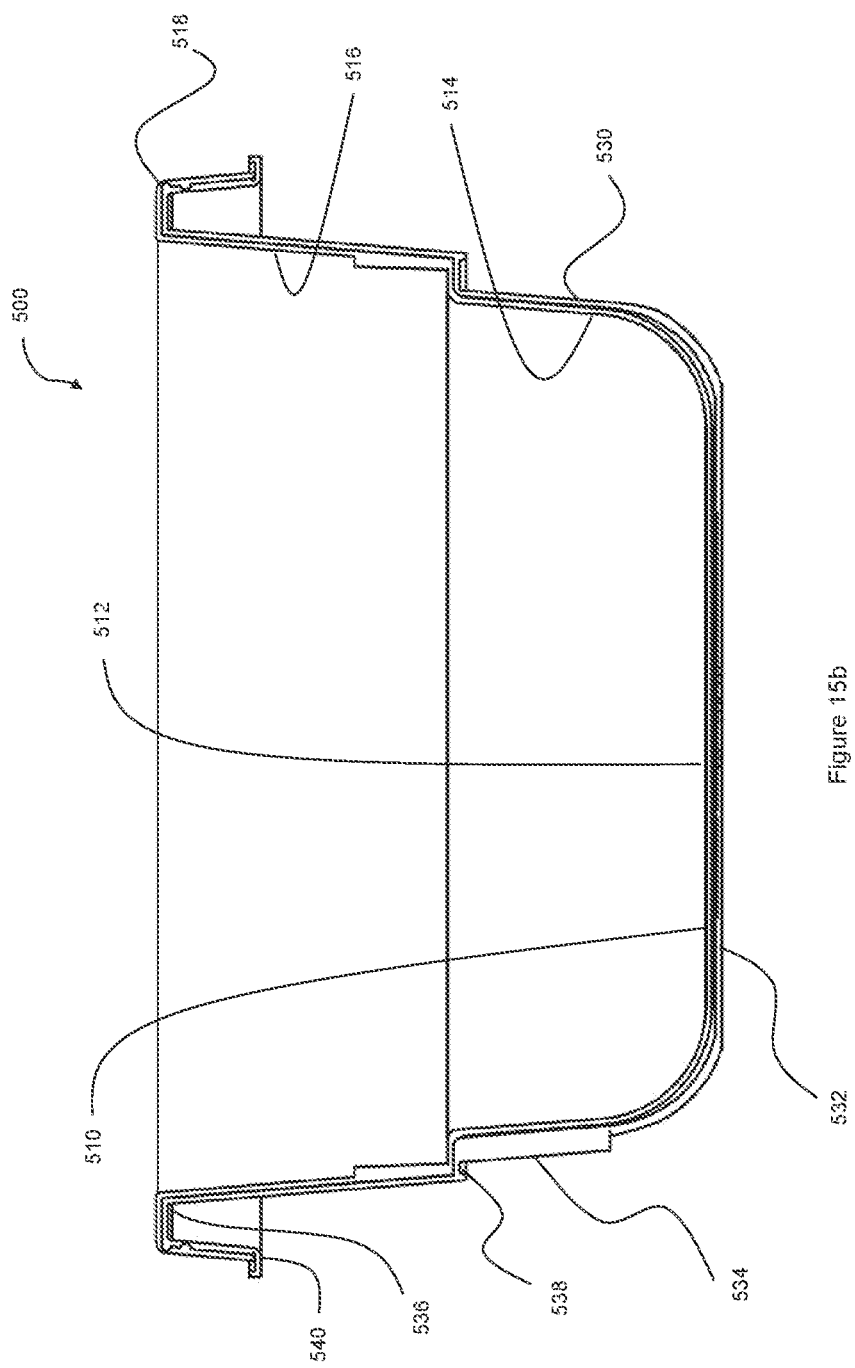

In the specific example shown in FIGS. 15a and 15b, the lid 510 has been forced substantially downward into the body 530 of the container 500 under the action of the actuator 120 and the compressing head 130. The lid 510 may be substantially inverted during the dispensing process to force out the product through the container outlet 550. In a specific example, the compressing head 130 has a steep frustoconical shape to fit into the 530 body of the container 500. The compressing head 130 may have filleted corners to prevent the formation of pressure points at the edges of the compressing head 130 during contact with the container 500.

During the dispensing process the folding arm portion 514 folds from projecting upwards away from the container base 532 to projecting down towards the container base 532. In an example, the folding arm portion 514 folds such that it is substantially adjacent to the side 534 of the base 532 up to the kink 538 as shown in FIG. 15b. In this way substantially the full capacity of the container 500 is evacuated from the container 500. Therefore, there is very little wastage of product with the apparatus 100.

The container 500 has a container outlet 550. In the specific example shown in FIG. 16, the container outlet 550 is arranged in the container base 532 of the container 500. The container outlet 550 allows product from within the container 500 to be dispensed from the container 500. By forcing the top surface 512 of the lid 510 of the container 500 towards the container outlet 550, the product contained within the container 500 can be dispensed.

Figure 16:
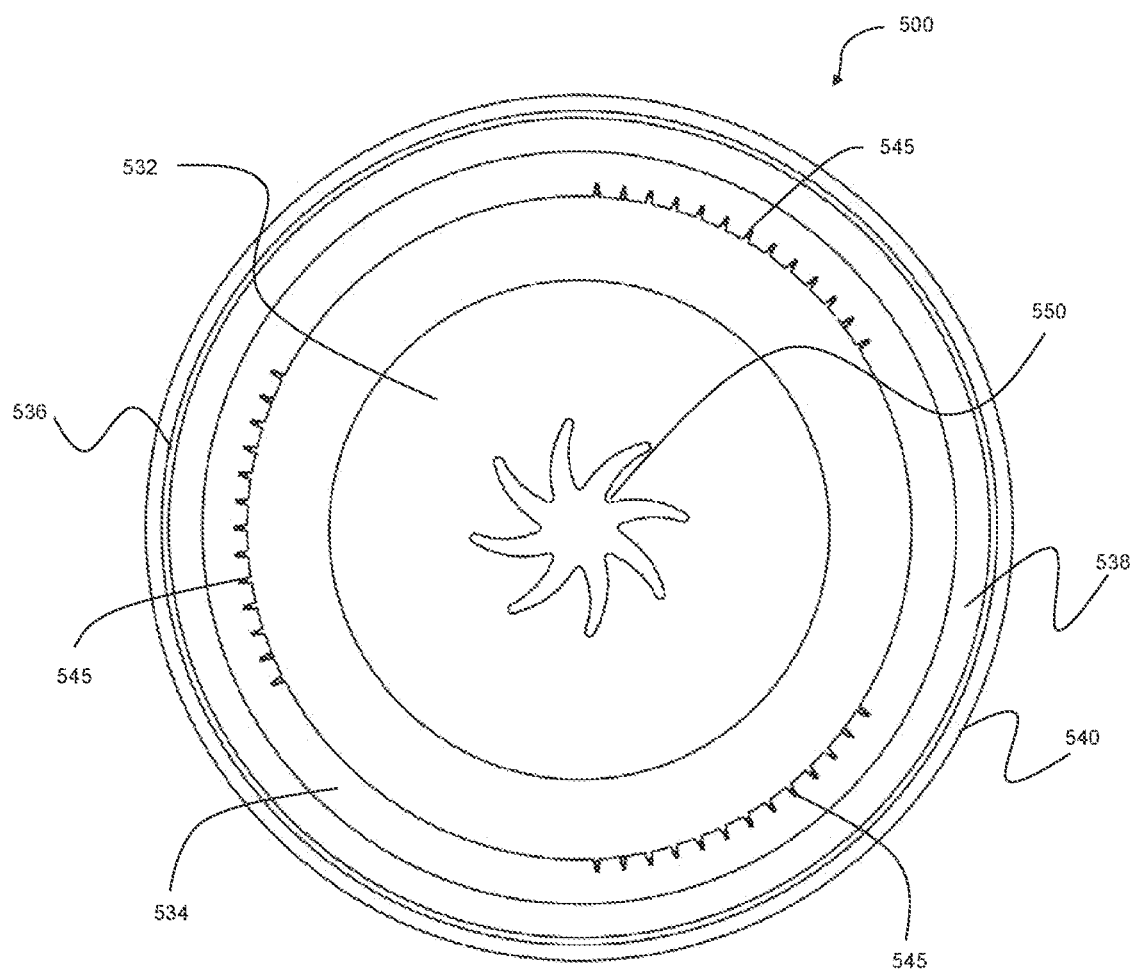
FIG. 16 shows a bottom-up view of an example of a container.

Referring still to FIG. 16, the container outlet 550 is arranged centrally in the container base 532. The central location of the container outlet 550 reduces the likelihood of product touching other elements of the apparatus 100 during the dispensing process. This increases the overall cleanliness and therefore hygiene of the apparatus 100 and the dispensed product. It also reduces the regularity with which the apparatus 100 must be cleaned.

The product will be extruded substantially in the shape of a tube with a cross section matching the shape of the container outlet 550. Therefore, if it is desirable aesthetically, the product can be dispensed having the cross-section of, for example, a star, a triangle, a quatrefoil, a crescent, a heart shape or a pinwheel or otherwise by shaping the container outlet 550 accordingly.

The container outlet 550 may be covered prior to use in the dispensing apparatus 100. This will prevent the product from coming out of the container outlet 550 during storage. The covering may be in the form of a plastic covering or packaging that may be removed prior to use. The covering may, in an example, be made from rice paper. Alternatively, as discussed above, a sticker may cover the container outlet 550 and be peeled off prior to use. Other similar features may be included for this purpose.

Figure 17C:
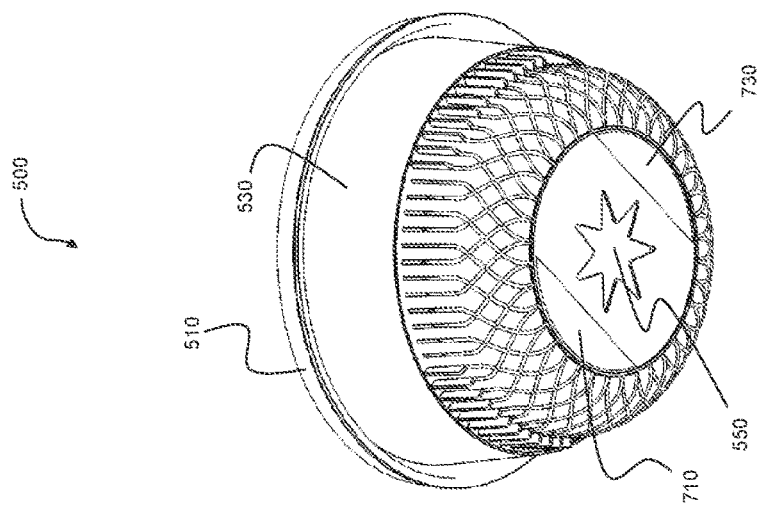
FIGS. 17a to 17c show perspective views of examples of a container for use in a dispensing apparatus before use.
Figure 17B:
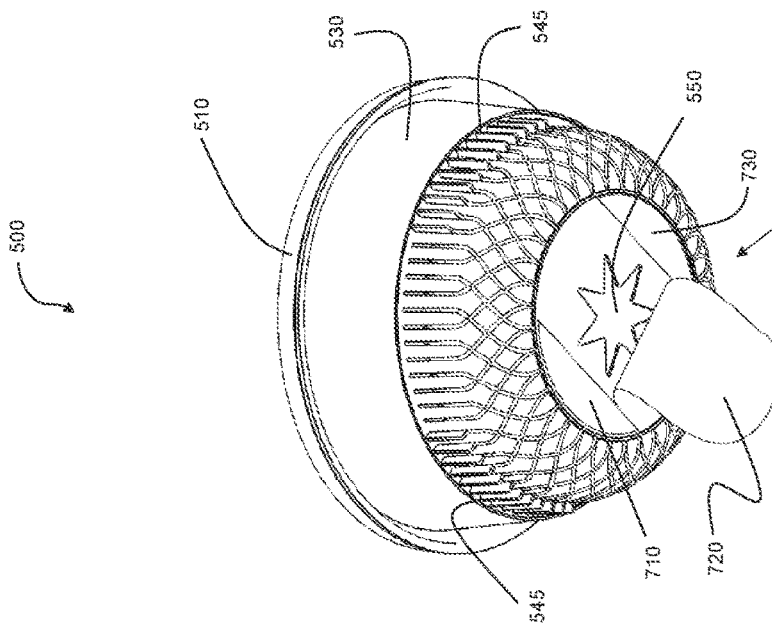
Figure 17A:
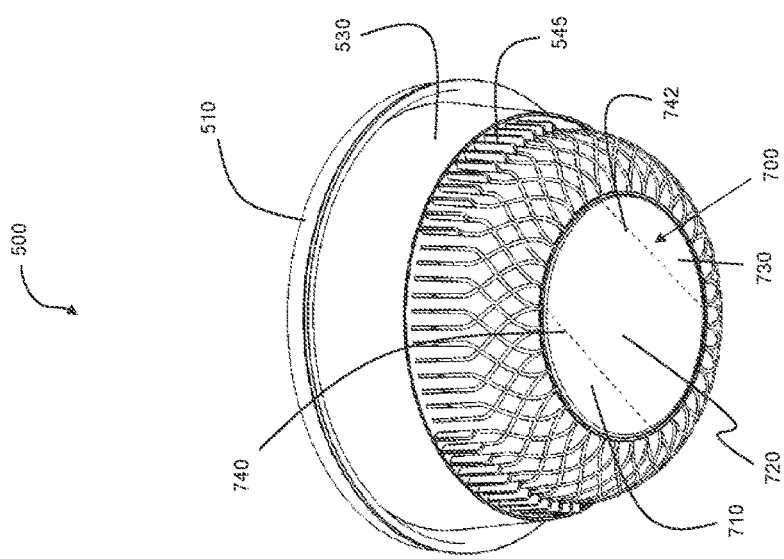

Referring now to FIGS. 17a, 17b and 17c, in this example, the container 500 has a sticker that covers the outlet 550 (See FIG. 17a) and which can be removed, for example peeled, from the base of the container 500 by a user to open the outlet 550 (See FIGS. 17b and 17c) in preparation for a food product contained in the container 500 to be dispensed.

In one example, the sticker 700 is formed from in-mould labelling (IML) and therefore is an integral part of the container 500. The sticker 700, shown in FIGS. 17a, 17b and 17c, has three portions. The first portion 710 is arranged to one side of the container outlet 550 and may cover the first injection mould point. The second portion 720 is arranged so as to cover the container outlet 550. The third portion 730 is arranged to the other side of the container outlet 550 with respect to the first portion 710 and may cover the second injection mould point. The second portion 720 is arranged between the first portion 710 and third portion 730 of the sticker 700.

The IML sticker 700 may be made of an electrically conductive material, for example a foil layer on a plastic substrate. The sticker 700 can be adhered to the container 500 during the moulding. The second portion 720 of the sticker 700 may be separately joined to the first portion 710 and the third portion 730 by separate lines of weakening or weakened regions 740, 742. These weakened regions 740, 742 may enable a user to remove the second portion 720 from adhering to the container 500 without removing the first portion 710 and third portion 730 of the sticker 700. The weakened region 740 may be a perforated region or a folded region or a region of reduced thickness in comparison to the rest of the sticker 700.

Prior to use, a user removes the second portion 720 of the sticker 700 from the container 500 to uncover the container outlet 550. The user moves the drawer 142 into the open position. The container 500 is then placed into the compartment 144 of the open drawer 142. The projections 545 on the container 500 ensure the container 500 fits properly into the compartment 144 in one of three orientations by virtue of being located at three places on the container 500, see FIG. 16. The drawer 142 is then closed. As the drawer 142 closes, the container 500 passes over the sensor 220d, which may be an induction sensor 220d. Each of the acceptable orientations of the container 500, i.e. the orientations where the container 500 fits into the compartment 144 so that the drawer 142 can be fully closed, may ensure the first portion 710, third portion 730, and, if remaining on the container 500 after insertion into the apparatus 100, the second portion 720, at least partially pass through the detection area of the induction sensor 220d. The induction sensor 220d will detect the presence of any foil portions that remain on the container 500. Therefore, the induction sensor has to detect two separate readings prior to sending information to the controller 210 that it can initiate the dispensing operation. The readings detected by the induction sensor 220d are those that are detected as the container 500 passes over the induction sensor 220d. The two readings indicate that one portion of foil has passed over the sensor 220d followed by a second portion of foil which is not connected to the first portion. This indicates that the second portion 720 of the sticker 700 has been removed from the container 500. In a specific example, the first of the two readings results from the first portion 710 of the sticker 700 and the second of the two readings results from the third portion 730 of the sticker 700. In a different example, the first of the two readings results from the third portion 730 of the sticker 700 and the second of the two readings results from the first portion 710 of the sticker 700. In comparison, a singular extended reading would indicate that the second portion 720 of the sticker 700 has not been removed from the container 500. If the induction sensor 220d records a singular long reading a message is sent to the controller 210, and the controller 210 sends a message to the control panel 200 to indicate a check should be performed on the container 500. If the induction sensor 220d records two separate readings, a message is sent to the controller 210 indicating initiation of the dispensing operation may begin.

The apparatus 100 may have more than one induction sensors 220d. In an example, one induction sensor may be arranged to identify a lack of inductive material around the outlet 550, while other induction sensors may be arranged to identify inductive material either side of the outlet 550. This arrangement may be used to identify genuine containers 500 for use with the apparatus 100. The induction sensors 220d may be optimised to identify only the specific material used in genuine containers 500 so that the apparatus cannot be activated using non-genuine containers without the genuine peelable label 700.

The use of induction sensors 220d removes the need for an optical sensor directed towards the outlet 550. Optical sensors positioned to obtain a view of the outlet 550 are in danger of having product drip onto the sensors, which are then prevented from functioning. Induction sensors 220d are therefore a more robust option for use in a dispensing apparatus 100.

In an example, there is an induction sensor 220d arranged to detect the closing of the drawer 142. The drawer 142 may have a portion of electrically conductive material (not shown) arranged within it that enters the sensing region of the inductive sensor 220d as the drawer 142 is moved from the opening position to the closed position. When the drawer 142 is fully closed, the sensor 22d notes the presence of the portion of electrically conductive material on the drawer 142 and sends a message to the controller 210. The controller 210 may prevent initiation of dispensing operations until the sensor 220d has informed the controller 210 that the drawer 142 has been moved fully into the closed position.

Other types of sensors for detecting conductive material could also be used in place of inductive sensors.

The peelable label 700 may be used in promotional activity. There could be winning codes or messages printed on the underside of the second portion 720 of the label 700 to be revealed prior to use.

The peelable label 700 may be of one colour and at least part of the container 500 may be of another colour. The colour sensor 220c may be arranged to detect the colours of the container 500 and the label 700, or specifically the portion of the label 700 arranged to cover the outlet 550. The sensor 220c may provide information to the controller 210 to prevent activation of the apparatus 100 if the sensor identifies the colour of the label 700. The presence of the label 700 would suggest that the container 500 has not been correctly prepared for dispensing as the outlet 550 would not be revealed. A message can then be sent to the user to inform them to check the preparation of the container 500. The detection of the colour of the container 500 may be used to indicate flavour of the food product, or the type of food product, within the container 500. In this example, the controller 210 may set operating conditions based on the information from the colour sensor 220c.

Accordingly, the apparatus 100 may have a sensor or detector 220 located to identify whether the container 500 has had a container outlet covering removed prior to initiating a dispensing operation. The sensor or detector 220 may be located under the region 140 and angled toward the container base 532. If the sensor 220 sends information to the controller 210 indicating the container outlet covering has not been removed, the controller 210 may prevent initiation of the dispensing operation. The controller 210 may program a message to be displayed on the control panel 200 indicating to the user the fault and how to remedy it.

In an embodiment, the apparatus 100 has an orientation confirmation mechanism to ensure the container 500 is oriented correctly in the region 140. The orientation confirmation mechanism may comprise a first feature or formation arranged to engage with a complementary feature or formation on a container 500. The apparatus 100 may be arranged to initiate operation only after the first feature engages with the complementary feature on the container 500.

In a specific example, the first feature may be a projection or a recess of the apparatus 100 which engages with a complementary recess or projection of the container 500. The formations may be a group of projections and/or a group of recesses, which may be intermixed or otherwise. The arrangement may be such that, if the orientation of the container 500 is not correct and the recess and projection do not engage, the container 500 does not sit flush against the floor of the compartment 144 of the drawer 142, such that the drawer 142 does not fully close. By preventing the drawer 142 being moved into the active position, the apparatus 100 cannot initiate operation of the apparatus 100.

In an example, the first feature may be in the shape of any aesthetically desirable shape. The first feature may be any geometric shape or design, such as a curve, or series of curves, depicting a smiling face, with the complementary shape being a depression with the form of the shape or design of the first feature.

The container 500 may have an asymmetrical design. In a specific example, the lip 540 may have one portion that is of a different size to rest of the lip 540. A lip portion may be larger than the rest of the lip 540. The lip portion may be in a specific design such as a substantially arc-shape portion or the like. Other designs may include aesthetically pleasing designs such as a sinusoidal shape, water drop shape, or other shape.

The lip portion may be complementary in shape to a surrounding of the compartment 144 of the drawer 142. In an example, the container 500 will only sit flush against the bottom of the compartment 144 once the lip portion is facing the handle 143 of the drawer 142. This is a further method for ensuring the orientation of the container 500 is correct prior to the drawer 142 being moved to the active position.

This apparatus 100 may have communication capabilities that enable communication with the Internet or nearby base stations or other systems via, for example, a router associated with the apparatus 100. The apparatus 100 may be able to be connected to a Wi-Fi network or a Local Area Network. The apparatus 100 may be able to use Bluetooth connectivity as well as over a telecommunications network e.g. GSM. The controller 210 of the apparatus 100 may be able to communicate information such as users' habits regarding product preference. The controller 210 may store and transmit information relating to the quantity of a certain type of product that has been used within a certain timeframe. This may be used to inform an owner of the apparatus 100 that that certain type of product may be running low.

The controller 210 may be arranged to auto-order containers of a certain type of product once the store of that particular container has fallen below a certain level.

The controller 210 of the apparatus 100 may be able to communicate to a remote computing device, for example a server (not shown), information recorded by the controller 210 regarding the quantity of different product types (for example the quantity of each container of each different flavour type of product) that has been used within the apparatus 100 within a given timeframe. This information may be used by an operator of the apparatus 100 to determine that the stock of a certain type of product is running low. The information may be provided any suitable communications link, wired or unwired, or any type of communications network, for example, the Internet.

The server may then route the information to an application on for, for example, a mobile phone, tablet or the like of an operator of the apparatus 100. Alternatively, the information could be provided by the controller 210 to the application directly over a communications link, for example, a wireless link.

It is envisaged that this arrangement will facilitate 'real time' stock management for the apparatus 100.

The controller 210 may be arranged to send a signal to a remote computing device, for example a server, to auto-order containers of a certain type of product once the controller 210 determines that a certain number of those types pf container have been used.

As well as such stock usage related information, other types of information may be provided by the controller 210, in this way, for example fault information and maintenance check date information etc.

The controller 210 may be able to detect and download software and/or firmware from a source such as the Internet. This may take the form of new actuator command sequences which have been developed in conjunction with for example a new flavour of product which has been released. Such sequences may include details regarding the forces required to dispense the product from the container. This would enable the apparatus 100 to be kept up to date with minimal effort from the owner. Further, the correct command sequences prevent damage to the actuator 120 through use of outdated command sequences which reduces the frequency of maintenance and therefore the average cost over time of maintenance of the apparatus 100. The actuator 120 may get damaged due to overload of the mechanical parts if compressing a flavour without the correct command sequence. Further details that could be updated include pricing for containers 500 and the like. Furthermore, this would prevent a requirement for updating the hardware of the apparatus 100 which is often an expensive aspect of machine maintenance for owners.

The apparatus 100 may be able to communicate information to a server which then routes the information to an application for, for example, a mobile phone, tablet or the like. Information such as: most recent maintenance check date and results thereof; most recent purchase of product and quantities thereof; remaining product quantities; total number of a certain type or flavour of product dispensed; regular locations where errors are detected; error codes for when a machine fails to operate successfully; and, suggested replacements if parts continually cause error messages, might be supplied to an owner of the apparatus 100 by the application.

FIGS. 18*a* to 22 show an alternative arrangement of the apparatus 100. Elements of this arrangement that are the same as in the arrangement shown earlier are given like reference numerals.

Figure 18A:
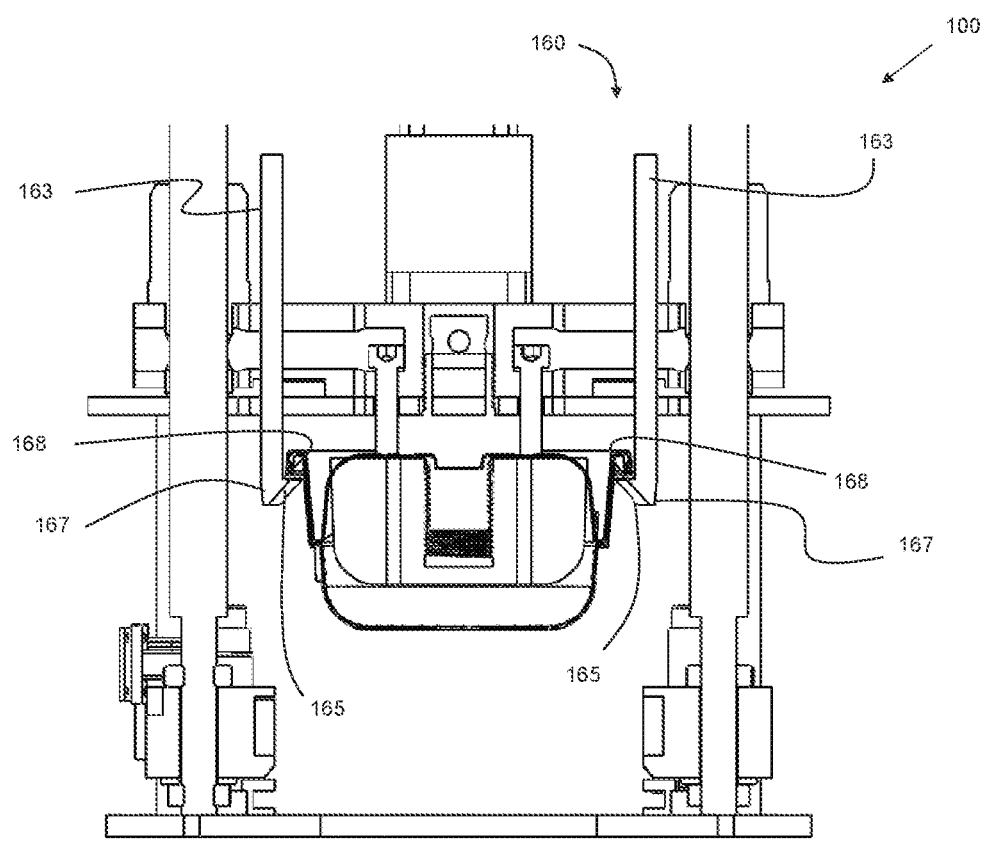
FIGS. 18a and 18b show transverse cross-sectional views of a portion of an example of a dispensing apparatus.
Figure 18B:
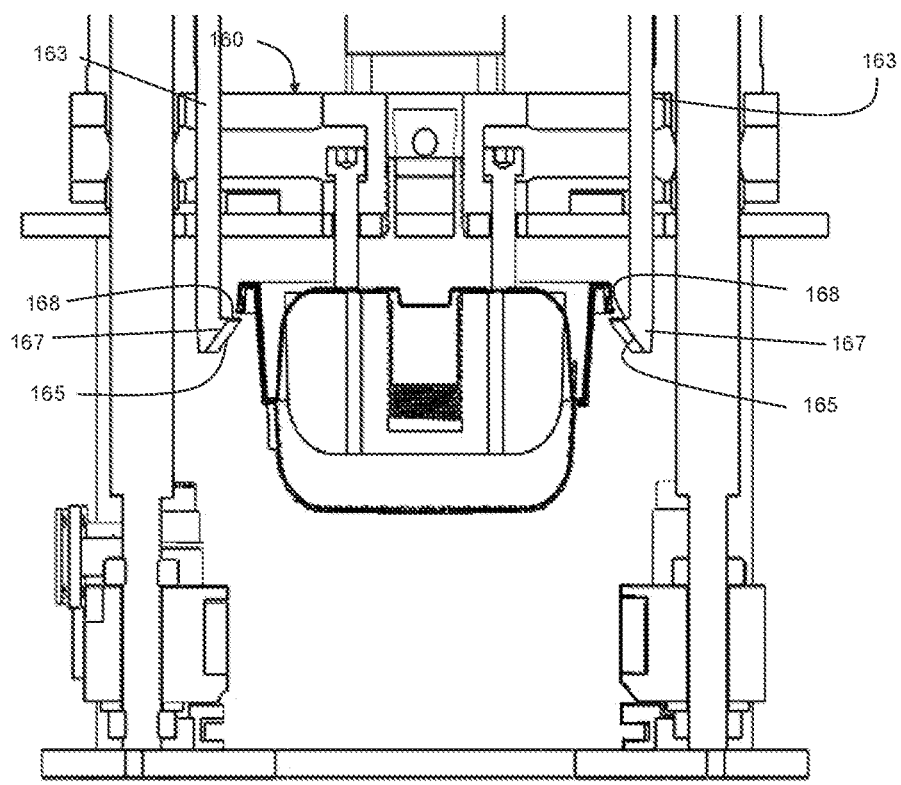

Referring specifically now to FIGS. 18*a* and 18*b*, there are shown cross-sectional side views of a portion of the apparatus 100 showing the container 500 and an alternative arrangement for the holding mechanism 160.

Referring to FIG. 18*a*, an alternative version of a holding mechanism 160 is shown having a set of sprung arms 163 which project vertically within the apparatus 100 and are biased by a spring arrangement (not shown) inwardly. Each arm 163 has an end with an engaging element 167. The engaging element 167 has a bevelled edge 165 and a flat surface 168. The arms 163 are arranged to move outwardly as the container 500 pushes past the engaging elements 167 during the upstroke of the actuator and then to spring back inwardly under the action of the spring arrangement (not shown). The container 500 abuts and move past the bevelled edges 165 during the upstroke of the actuator. During the return stroke the container 500 is held on the flat surfaces 168 of the catches 167 and is therefore retained in the holding mechanism 160.

Referring now to FIG. 18*b*, there is shown the version of the holding mechanism 160 of FIG. 18*a* when the engaging elements 167 are not engaging the container. The arms 163 of the holding mechanism 160 are forced outwardly so that the catches 167 are not close enough to hold the container. This may be as the drawer is pulled out of the apparatus 100 and the container is released from the engaging elements 167. This mechanism for moving the arms 163 outwardly is described below with reference to FIGS. 19*a* and 19*b*.

Figure 19A:
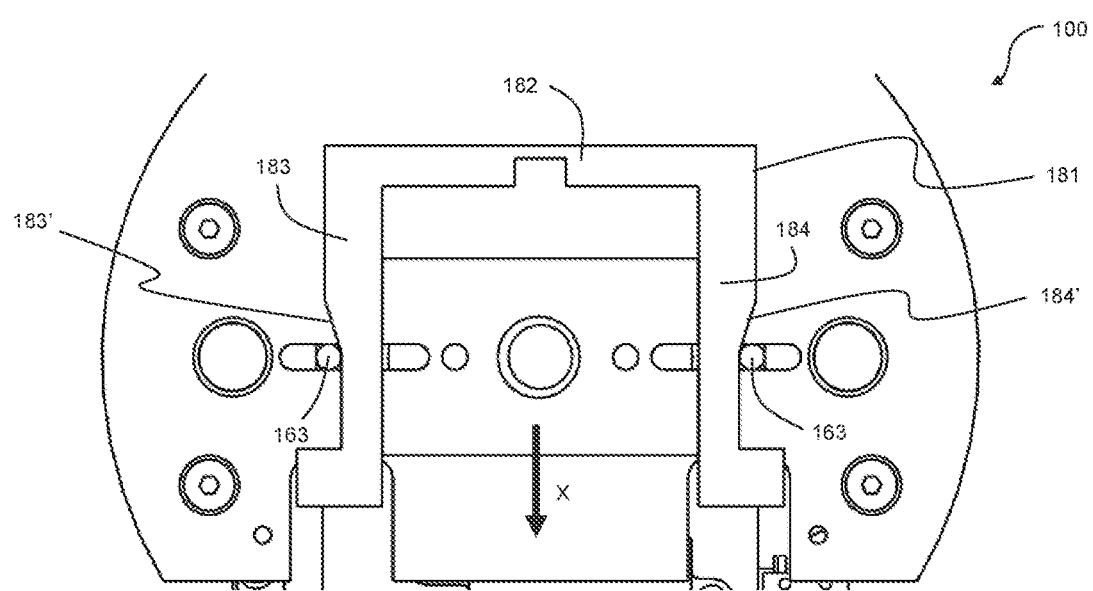
FIGS. 19 and 19b show cross-sectional top-down views of a portion of an example of a dispensing apparatus.
Figure 19B:
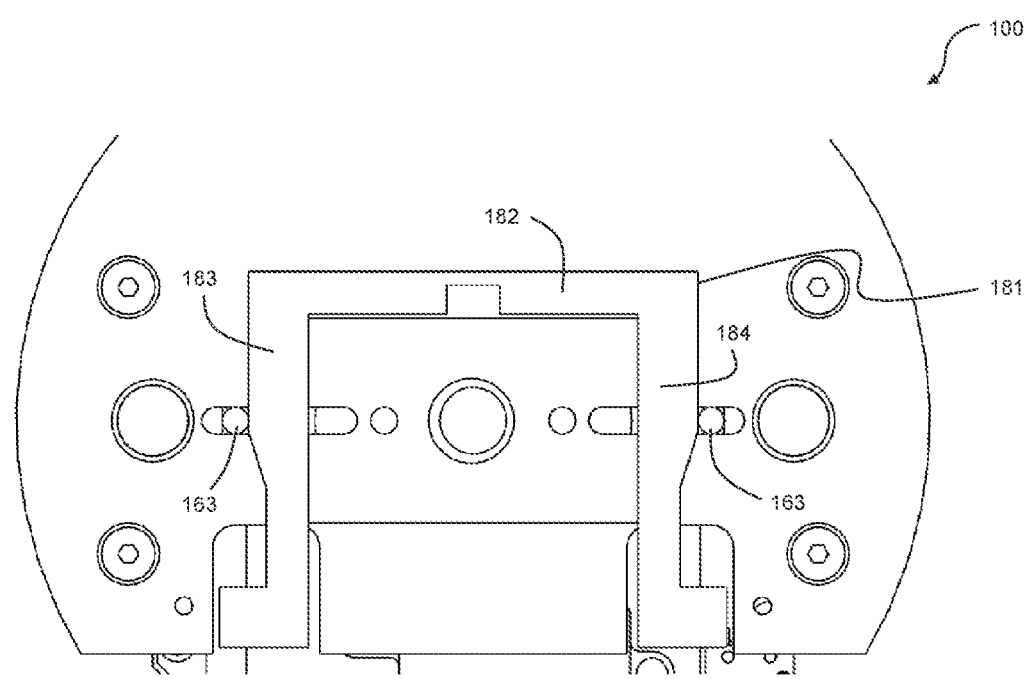

FIGS. 19*a* and 19*b* show cross-sectional top-down views of a portion of the apparatus 100 comprising a member 181, in this example, a U-shaped bar. The member 181 is arranged to force the arms 163 slightly apart into the positions shown in FIG. 18*b* when the member 181 is moved towards the front of the apparatus 100, in the direction X, from the retracted position shown in FIG. 19A to the extended position shown in FIG. 19*b* as the drawer of the apparatus (not shown in FIGS. 19*a* and 19*b*) is opened. This releases the spent container from the holding mechanism into the collector.

The member 181, has a flat base portion 182 and two arms 183, 184 extending from the peripheries of the base portion 182 to form the U-shape. Portions of the arms 183, 184 of the U-shape bar 181 are shaped to provide a wedge-shape portions 183', 184'. The arms 183, 184 are therefore shaped so that the arms 183, 184 are thicker closer to the base portion 182, with the wedge portions 183', 184' leading to a thinner part of the arms 183, 184 further from the base portion 182.

As the U-shape bar 181 moves towards the front of the apparatus 100, the wedge-shape portions 183', 184' move toward the pair of arms 163 connecting to the pair of engaging elements 167 (shown in FIGS. 18*a* and 18*b*). The arms 163 project vertically downward from the U-shape bar 181 towards the engaging elements 167, the U-shape bar 181 being located above the engaging elements 167. As the U-shape bar 181 moves in the direction X towards the front of the apparatus 100, the wedge-shape portions 183', 184' push against the arms 163. The arms 163 are moved outwards as the wedge-shape portions 183', 184' get wider. Therefore, the arms 163 are moved outwardly from the central longitudinal axis of the apparatus 100 by the action of the U-shape bar 181 moving forward, as shown in FIG. 19*b*. The engaging elements 167 (shown in FIGS. 18*a* and 18*b*) attached to the arms 163 therefore also move outwardly from the central longitudinal axis of the apparatus 100. This outward movement results in the arms 163 and engaging elements 167 having the arrangement shown in FIG. 18*b*, and can release a held container from the holding mechanism 160.

Figure 20:
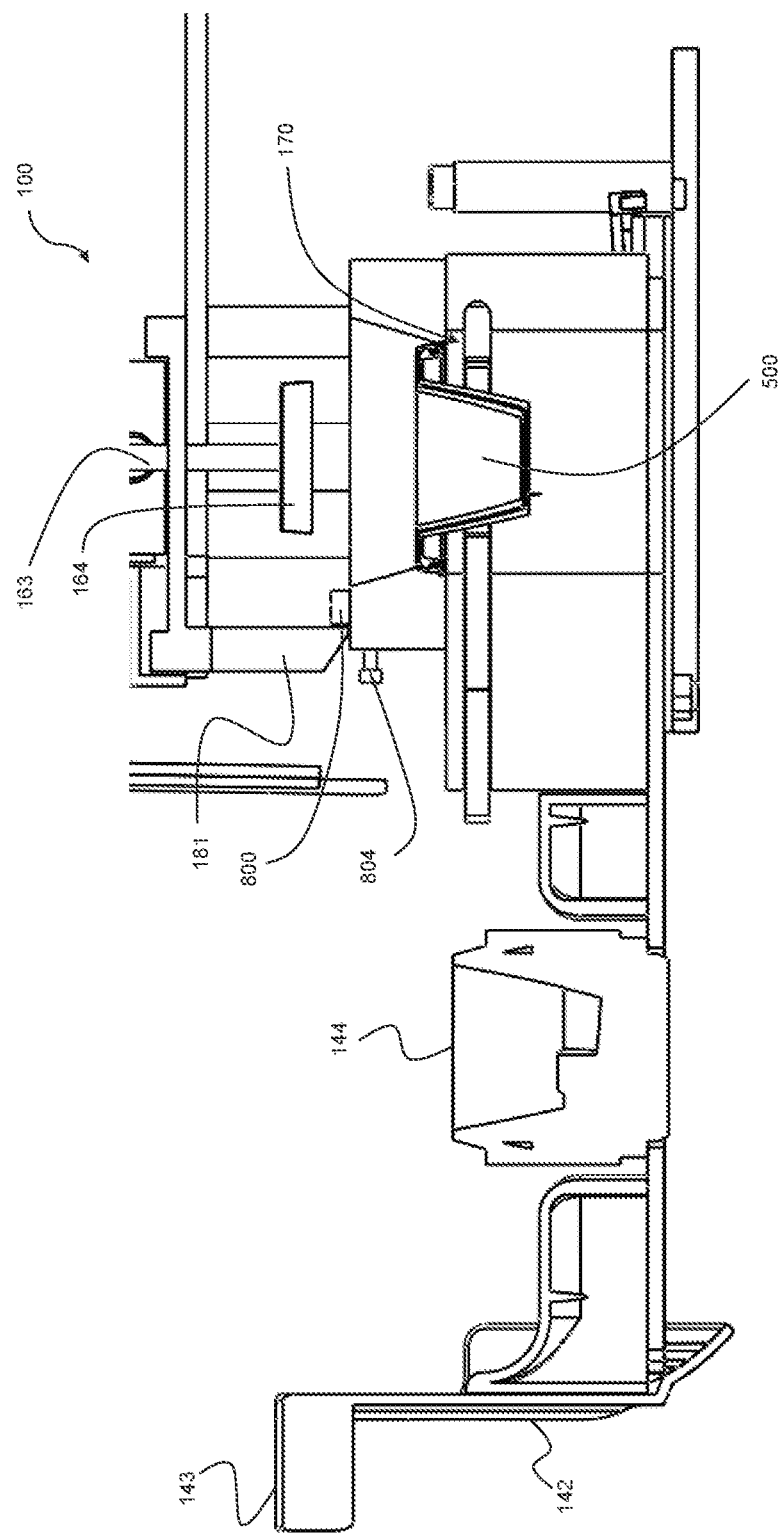
FIG. 20 shows a longitudinal cross-sectional view of a portion of an example of a dispensing apparatus.

As shown in FIG. 20, the apparatus 100 may comprise a release lever 800 that is brought into contact with and moves the member 181 forwards when the tray 142 is pulled into the open position to cause the engaging elements 164 to be moved apart as described above to allow the spent container 500 to be received in the collector 170. The user may input a fresh container into the compartment 144 of the drawer 142 ahead of another dispensing operation.

The apparatus 100 has a release button 804 which the user can push to retract release lever 800 downwards into the region below the release level 800. This then enables a user to remove the entire drawer 142 from the apparatus 100 for e.g. cleaning or maintenance.

Figure 21A:
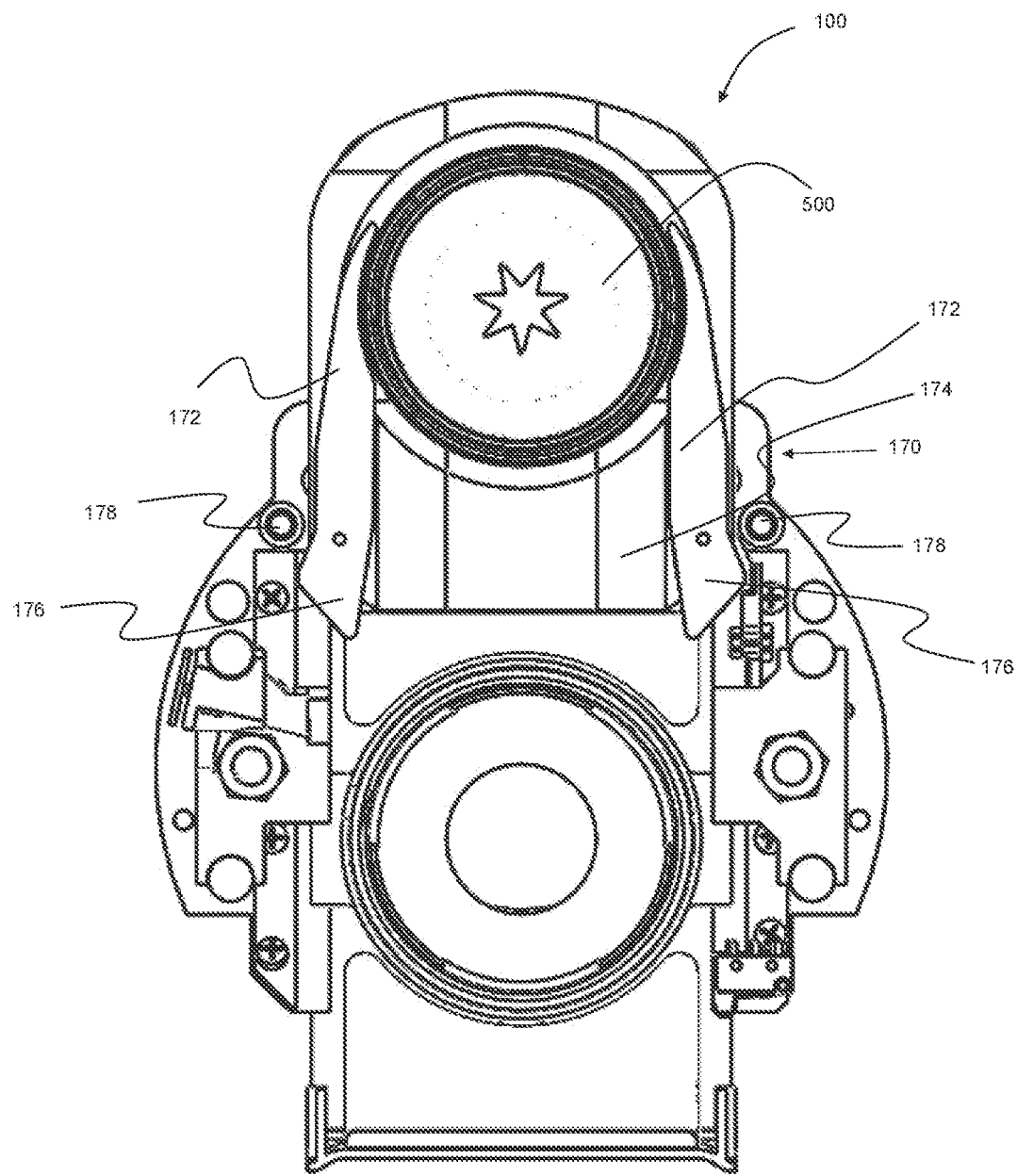
FIGS. 21a and 21b show top down views of an example of a container in use in a collector of a dispensing apparatus; and,
FIG. 22 shows a longitudinal cross-sectional view of an example of a dispensing apparatus.
Figure 21B:
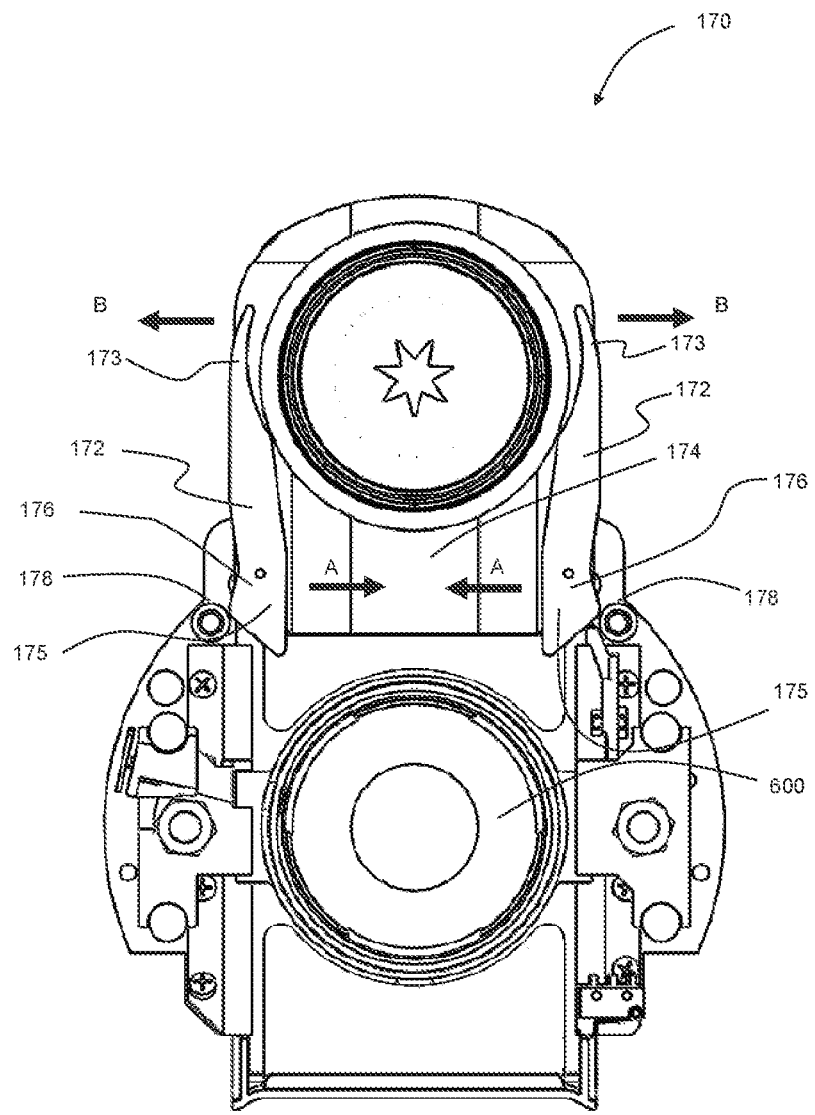

Referring now to FIGS. 21*a* and 21*b*, there is shown a cross-sectional plan view of a portion of the apparatus 100 having an alternative collector 170 to that shown previously. In this example, the collector 170 shown has two arms 172 and a base 174. The arms 172 have wider portions 176 arranged at the forward end of the arms 172. Also shown in FIGS. 21*a* and 21*b* are a pair of posts 178. Once released from the holding mechanism 160, shown in FIG. 18*b*, the container 500 is received between the arms 172 of the collector 170 as shown in FIG. 21*a*.

As described previously, once the container is held by the arms 172, the container may be moved to the chute by action of closing the drawer 143. As the drawer 143 is moved to the closed position, collector 170 is moved towards the back of the apparatus 100 and the arms 172 of the collector 170 engage with the posts 178 causing the arms 172 are pivoted outwardly around a pivot point to release the spent container 500 as is shown in FIG. 21*b*. The next time the drawer is pulled back into the open position, the arms 172 of the collector engage with the posts 178 and pivot into the position shown FIG. 21 in which they can receive the next spent container.

Figure 22:
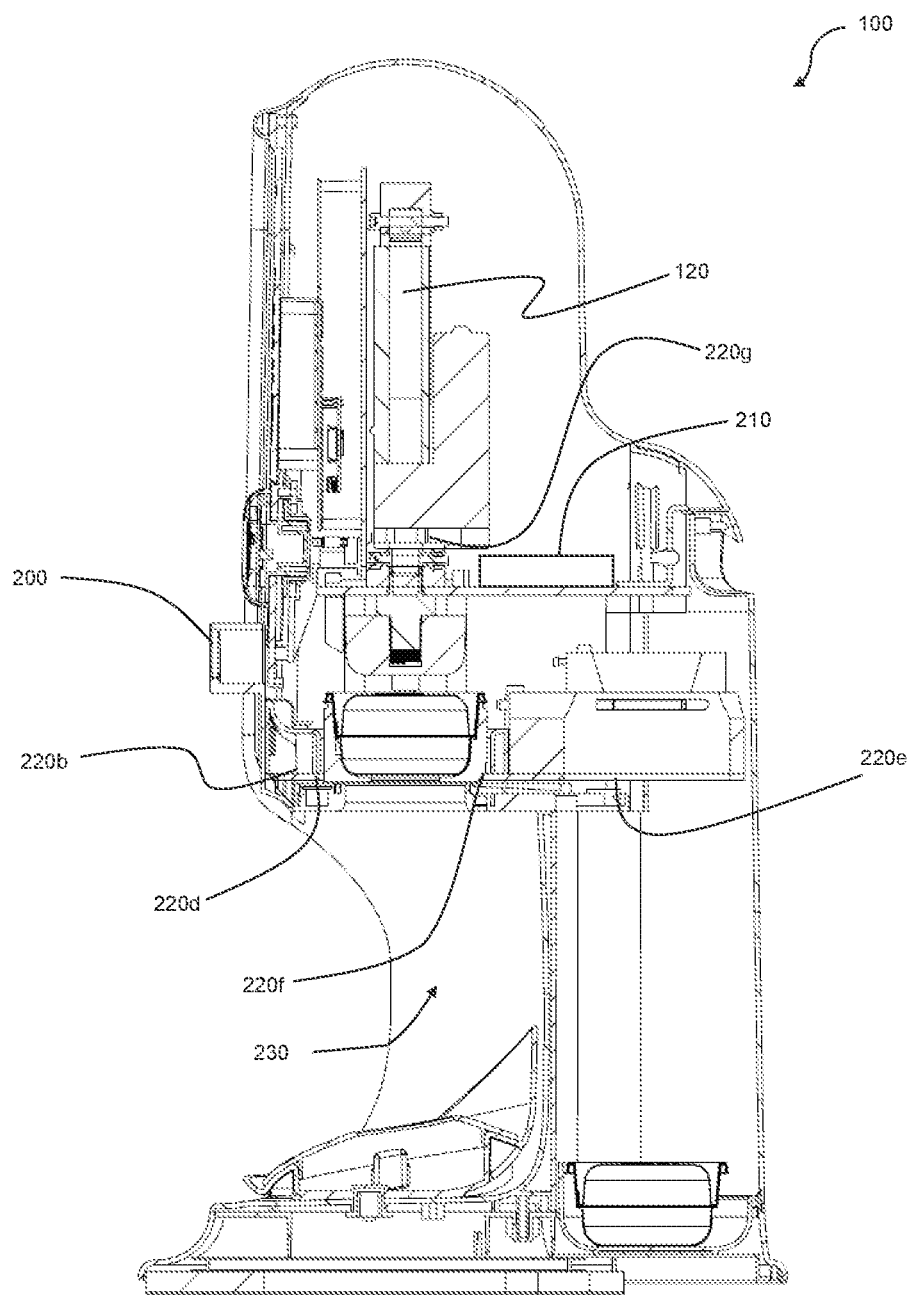

Referring now to FIG. 22, there is shown a longitudinal cross-sectional view of an apparatus 100 according to an example and which includes the arrangements shown in FIGS. 18 to 21.

The apparatus 100 shown may have a number of sensors 220 similar to, or identical to, those as described previously with respect to FIG. 11. Notably, the apparatus 100 shown in FIG. 22 does not have the bar code reader 220a. The apparatus 100 shown in FIG. 22 does additionally have a sensor 220g in communication with the actuator 120. The sensor 220g may provide data to the controller 210 regarding the force of the actuator 120 during the dispensing operation. Prior to initiation, the controller 210 will have been sent data regarding the type of product in the container 500 in the dispensing operation. Any particular type of product will have predictable force requirements from the actuator 120 to enable the product to be dispensed. The controller 210 can compare the force reading from the sensor 220g to the expected force to identify any issues in the dispensing operation. This can be done by comparing the force to a database, which may remote from the apparatus or may be part of the electronics of the apparatus. If the force is much greater than expected, the controller 210 can abort the dispensing operation to protect the actuator 120. The sensor 220g may be a feedback sensor for providing regular updates on the force of the actuator 120.

In an example, the controller 210 may be a microcontroller, and the controller 210 may comprise a local memory for storing signals received from at least one of the sensors 220 or other messaging element in communication with the apparatus 100. The local memory may be part of the controller 210 and/or provided separately of the controller 210. Additionally or alternatively the local memory store may be provided as separate memory. In the specific example, wherein the local memory store is provided as a separate memory, the controller 210 is in communication with the local memory store. Either way, the controller 210 may store in the local memory information received or obtained from any of the sensors 220 or other messaging element in communication with the apparatus 100. The controller 210 may additionally or alternatively store instructions for the actuator 120 in the memory store. The information and instructions may be stored locally to the device 120. The memory store may comprise the database comprising operating conditions for use by the apparatus 100. The controller 210 may access the memory store to look up operating condition parameters.

The database may be updateable over a communication link as described above, to ensure the latest products are compatible with the apparatus 100.

The apparatus 100 described herein may have a communication link to a detector and/or controller of a store of containers 500. The detector of the store of containers 500 may be a thermal detector for observing the temperature of the store of containers 500. The detector may relay readings of the temperature of the store to the apparatus 100 e.g. over Bluetooth connection, via a telecommunications network, for example a GSM network, a WCDMA network or an LTE network, over a wired communication, such as ethernet, over Wi-Fi or similar. The controller 210 of the apparatus 100 may receive the readings from the detector of the store of containers 500 and set operating conditions for containers 500 from that store accordingly. If the controller 210 receives a series of readings which suggest a malfunction has occurred in the store, such as a power cut which could lead to an increase in the temperature of e.g. frozen or semi-frozen food product containers 500 within the store, the controller 210 can prevent initiation of a dispensing operation on containers 500 from the store of containers 500. The increase of temperature may lead to a thawing of the food product in the containers 500. If the power cut is resolved the product will subsequently re-freeze. The recrystallization of the food product can impact the force requirements of the actuator 120 for extruding the product. The food product may also not be fit for consumption after thawing and re-freezing. Therefore, the prevention of initiation of a dispensing operation based on e.g. temperature readings from the environment of the store of the containers 500 is advantageous for the user in preventing malfunctions and increasing the overall hygiene of the apparatus 100.

In the event that a number of stores supply the apparatus 100, the controller 210 will receive a temperature reading and be able to associate it with a specific store, such that, if one store of many malfunctions, only containers 500 from that store are prevented from being used in the apparatus 100. The controller 210 of the apparatus 100 may send information request messages to the stores to provide updates on the environment of the store.

Other products that might be dispensed from the apparatus 100 include fruit, vegetables, confectionary, sorbet, and the like.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A dispensing apparatus for dispensing a frozen or semi-frozen food product from a container of the frozen or semi-frozen food product, the dispensing apparatus comprising:
   a base;
   a housing body, wherein the housing body is for housing a region for receiving the container of the frozen or semi-frozen food product;
   a compressing head for compressing the container to dispense the frozen or semi-frozen product from the container; and
   wherein the housing body is rotatable with respect to the base to provide access to the housing body for a user from any side of the dispensing apparatus.

2. A dispensing apparatus according to claim 1, wherein the base comprises a turntable for rotating the housing body with respect to the base.

3. A dispensing apparatus according to claim 1, wherein the housing body is rotatable with respect to the base by at least 90°.

4. A dispensing apparatus according to claim 1, wherein the apparatus is arranged so that the apparatus is securable to a surface on which the base of the apparatus is based when the housing body is rotated with respect to the base.

5. A dispensing apparatus according to claim 1, comprising a locking element for temporarily securing the apparatus in a position wherein the housing body is rotated with respect to the base.

6. A dispensing apparatus according to claim 5, wherein the locking element is at least one of a frictional brake or an activatable projection.

7. A dispensing apparatus according to claim 1, wherein the housing body comprises:
   a drawer comprising the region for receiving the container, the drawer arranged to be moved between an open position in which the container can be placed into the region and a closed position in which the container, when in the region, is loaded into the housing body, wherein the housing body is rotatable with respect to the base to provide access to the drawer for the user.

8. A dispensing apparatus according to claim 1, wherein the apparatus comprises a chute for collecting the container after the frozen or semi-frozen food product has been dispensed from the container.

9. A dispensing apparatus according to claim 8, wherein the housing body comprises a door for accessing the chute, wherein the housing body is rotatable with respect to the base to provide access to the door for the user.

10. A method of dispensing a frozen or semi-frozen food product using the dispensing apparatus of claim 1, the method comprising:
- selecting a container of the frozen or semi-frozen food product for use with the dispensing apparatus;
- rotating the housing body of the dispensing apparatus relative to the base of the dispensing apparatus from an initial position to an operating position;
- inserting the container of the frozen or semi-frozen food product into the region for receiving the container of the frozen or semi-frozen food product;
- initiating a dispensing operation;
- completing the dispensing operation; and,
- rotating the housing body of the dispensing apparatus relative to the base of the dispensing apparatus back from the operating position to the initial position.

11. A method according to claim 10, wherein the operating position is at least 90° rotated from the initial position.

* * * * *